United States Patent
Kosaka et al.

(10) Patent No.: US 11,542,127 B2
(45) Date of Patent: Jan. 3, 2023

(54) GUIDE INFORMATION DISPLAY DEVICE AND CRANE

(71) Applicants: TADANO LTD., Kagawa (JP); THE SCHOOL CORPORATION KANSAI UNIVERSITY, Osaka (JP)

(72) Inventors: Takayuki Kosaka, Kagawa (JP); Iwao Ishikawa, Kagawa (JP); Satoshi Kubota, Osaka (JP); Shigenori Tanaka, Osaka (JP); Kenji Nakamura, Osaka (JP); Yuhei Yamamoto, Osaka (JP); Masaya Nakahara, Osaka (JP)

(73) Assignees: TADANO LTD., Kagawa (JP); THE SCHOOL CORPORATION KANSAI UNIVERSITY, Osaka (JP)

( * ) Notice: Subject to any disclaimer, the term of this patent is extended or adjusted under 35 U.S.C. 154(b) by 443 days.

(21) Appl. No.: 16/632,622

(22) PCT Filed: Jul. 19, 2018

(86) PCT No.: PCT/JP2018/027185
§ 371 (c)(1),
(2) Date: Jan. 21, 2020

(87) PCT Pub. No.: WO2019/017455
PCT Pub. Date: Jan. 24, 2019

(65) Prior Publication Data
US 2020/0198939 A1    Jun. 25, 2020

(30) Foreign Application Priority Data

Jul. 21, 2017  (JP) .............................. JP2017-142201

(51) Int. Cl.
*B66C 13/00*  (2006.01)
*B66C 13/46*  (2006.01)
(Continued)

(52) U.S. Cl.
CPC .............. *B66C 13/46* (2013.01); *B66C 13/16* (2013.01); *B66C 13/22* (2013.01); *B66C 15/065* (2013.01); *B66C 2700/08* (2013.01)

(58) Field of Classification Search
CPC ......... B66C 13/16; B66C 13/22; B66C 13/44; B66C 13/46; B66C 15/04; B66C 15/065; B66C 23/92
See application file for complete search history.

(56) References Cited

U.S. PATENT DOCUMENTS

2008/0075326 A1    3/2008  Otani et al.
2011/0076130 A1*   3/2011  Stocker ................. B66C 15/045
                                                    414/815
(Continued)

FOREIGN PATENT DOCUMENTS

CN    101153796 A    4/2008
CN    103500329 A    1/2014
(Continued)

OTHER PUBLICATIONS

Sep. 18, 2018, International Search Report issued for related PCT Application No. PCT/JP2018/027185.
Sep. 18, 2018, International Search Opinion issued for related PCT Application No. PCT/JP2018/027185.
Oct. 23, 2020, European Search Report issued for related EP Application No. 18836131.5.

*Primary Examiner* — Emmanuel M Marcelo
(74) *Attorney, Agent, or Firm* — Paratus Law Group, PLLC

(57) ABSTRACT

To accurately present guide information which expresses the shape and height of a hoisting load and an object located near the hoisting load. A guide information display device is equipped with: a data acquisition unit provided with a camera for capturing an image of a hoisting load region which includes at least a hoisting load and the ground surface below the hoisting load from above the hoisting load, and a laser scanner for obtaining a data point group in the hoisting load region; a data processing unit for estimat- (Continued)

ing the top surface of the hoisting weight, the ground surface, and the top surfaces of objects, on the basis of the obtained data point group, and generating guide frames which surround the top surfaces of the hoisting weight and objects; and a data display unit which displays guide information obtained by overlapping the generated guide frames and the captured image with one another.

15 Claims, 30 Drawing Sheets

(51) Int. Cl.
*B66C 13/16* (2006.01)
*B66C 13/22* (2006.01)
*B66C 15/06* (2006.01)

(56) References Cited

U.S. PATENT DOCUMENTS

2017/0217737 A1* 8/2017 Rudy ................... G06T 7/0004
2018/0282132 A1* 10/2018 Laitasalmi ............. B66C 13/46
2019/0241408 A1* 8/2019 Strahl .................. B66C 23/905

FOREIGN PATENT DOCUMENTS

| EP | 2543622 A1 | 1/2013 |
| JP | 2013-120176 A | 6/2013 |
| JP | 2014-144850 A | 8/2014 |

\* cited by examiner

A-A CROSS SECTION

GUIDE INFORMATION DISPLAY DEVICE AND CRANE

CROSS REFERENCE TO PRIOR APPLICATION

This application is a National Stage Patent Application of PCT International Patent Application No. PCT/JP2018/027185 (filed on Jul. 19, 2018) under 35 U.S.C. § 371, which claims priority to Japanese Patent Application No. 2017-142201 (filed on Jul. 21, 2017), which are all hereby incorporated by reference in their entirety.

TECHNICAL FIELD

The present invention relates to a technique for a guide information display device that assists a crane operation performed by an operator, and a crane equipped with the same.

BACKGROUND ART

In known techniques, the efficiency of a crane operation is conventionally improved by confirming a suspended load and a status around the suspended load based on guide information displayed on a monitor. Such a technique is disclosed in, for example, PTL 1.

PTL 1 discloses a technique of a height information notification system that provides a notification of an object height near a suspended load. In the height information notification system for an object near a suspended load according to PTL 1, a distance from the distal end of a boom to the vicinity of the suspended load is measured by distance measuring sections such as a laser distance sensor, a microwave distance sensor, and a stereo camera. The system is configured so as to detect the position of an object near a suspended load by using a distance measurement result, calculate the height of the object, generate a processed image (guide information) in which the position and height of the object near the suspended load are associated with an image taken by a camera, and then display the guide information on a monitor.

In a guide information display device (height information notification system) described in PTL 1, guide information notifies an operator of position information and height information on a suspended load and an object near the suspended load, thereby suppressing the contact of the suspended load with the object near the suspended load.

CITATION LIST

Patent Literature

PTL 1
Japanese Patent Application Laid-Open No. 2013-120176

SUMMARY OF INVENTION

Technical Problem

However, when position information on a suspended load and an object near the suspended load is obtained by using local measurement data acquired by a distance measuring section as in the related art described in PTL 1, it is difficult to accurately acquire the shapes of the suspended load and a ground object near the suspended load and the height of a ground surface, leading to difficulty in presenting accurate guide information.

Thus, according to the conventional guide information display device, it is difficult for an operator to accurately recognize the shapes of the suspended load and the ground object near the suspended load based on the guide information.

The present invention has been devised to solve the problem. An object of the present invention is to provide a guide information display device that can accurately present guide information on the shapes and heights of a suspended load and a ground object near the suspended load, and a crane equipped with the same.

Solution to Problem

The technical problem of the present invention was described above. Solutions to the problem will be described below.

More specifically, a guide information display device according to the present invention includes: a data acquisition section including a camera and a laser scanner, the camera being configured to capture an image of an area from above a suspended load, the area including at least the suspended load and a ground surface below the suspended load, the laser scanner being configured to acquire point cloud data from above the suspended load in the area; a data processing section that estimates a top surface of the suspended load, the ground surface in the area, and a top surface of a ground object in the area based on the point cloud data acquired by the laser scanner and generates a guide frame surrounding the top surface of the suspended load and a guide frame surrounding the top surface of the ground object; and a data display section that displays guide information including the guide frames generated by the data processing section and the image captured by the camera such that the guide frames and the image are superimposed on each other.

The guide information display device configured thus can accurately present guide information on the shapes and heights of the suspended load and the ground object near the suspended load.

In the guide information display device according to the present invention, when the ground object has a plurality of estimated top surfaces, the top surfaces including a first top surface of the ground object with a maximum height value, and a second top surface of the ground object with a difference in height value relative to the first top surface of the ground object, the difference being at most a threshold value, the second top surface overlapping the first top surface of the ground object in plan view, the data processing section generates the guide frame entirely surrounding the first top surface of the ground object and the second top surface of the ground object.

The guide information display device configured thus can more specifically present guide information with ease of viewing.

Further, in the guide information display device according to the present invention, the data processing section calculates height values of the top surface of the suspended load and the top surface of the ground object and generates the guide information including height information on the top surface of the suspended load and the top surface of the ground object.

The guide information display device configured thus can more accurately present information on the heights of the suspended load and the ground object.

Further, in the guide information display device according to the present invention, the data processing section changes colors in the guide frames and the height information according to the calculated height values of the top surface of the suspended load and the top surface of the ground object.

The guide information display device configured thus can more accurately present information on the heights of the suspended load and the ground object.

A crane according to the present invention includes the guide information display device configured thus.

The crane configured thus can more accurately present information on the heights of the suspended load and the ground object to an operator of the crane.

Advantageous Effect of Invention

The effect of the present invention will be described below.

The guide information display device according to the present invention can accurately present guide information on the shapes and heights of the suspended load and the ground object near the suspended load.

The crane according to the present invention can accurately present the guide information on the shapes and heights of the suspended load and the ground object near the suspended load to an operator of the crane.

BRIEF DESCRIPTION OF DRAWINGS

FIG. 5A illustrating a schematic diagram viewed in the Z-axis direction, FIG. 5B illustrating a schematic diagram viewed in the X-axis direction:

FIG. 6B illustrating a schematic diagram viewed in the Y-axis direction;

FIG. 8A illustrating a data display section that displays image M, FIG. 8B illustrating the data display section that displays superimposed image M and guide information GD;

DESCRIPTION OF EMBODIMENTS

An embodiment of the invention will be described below.

Figure 1:
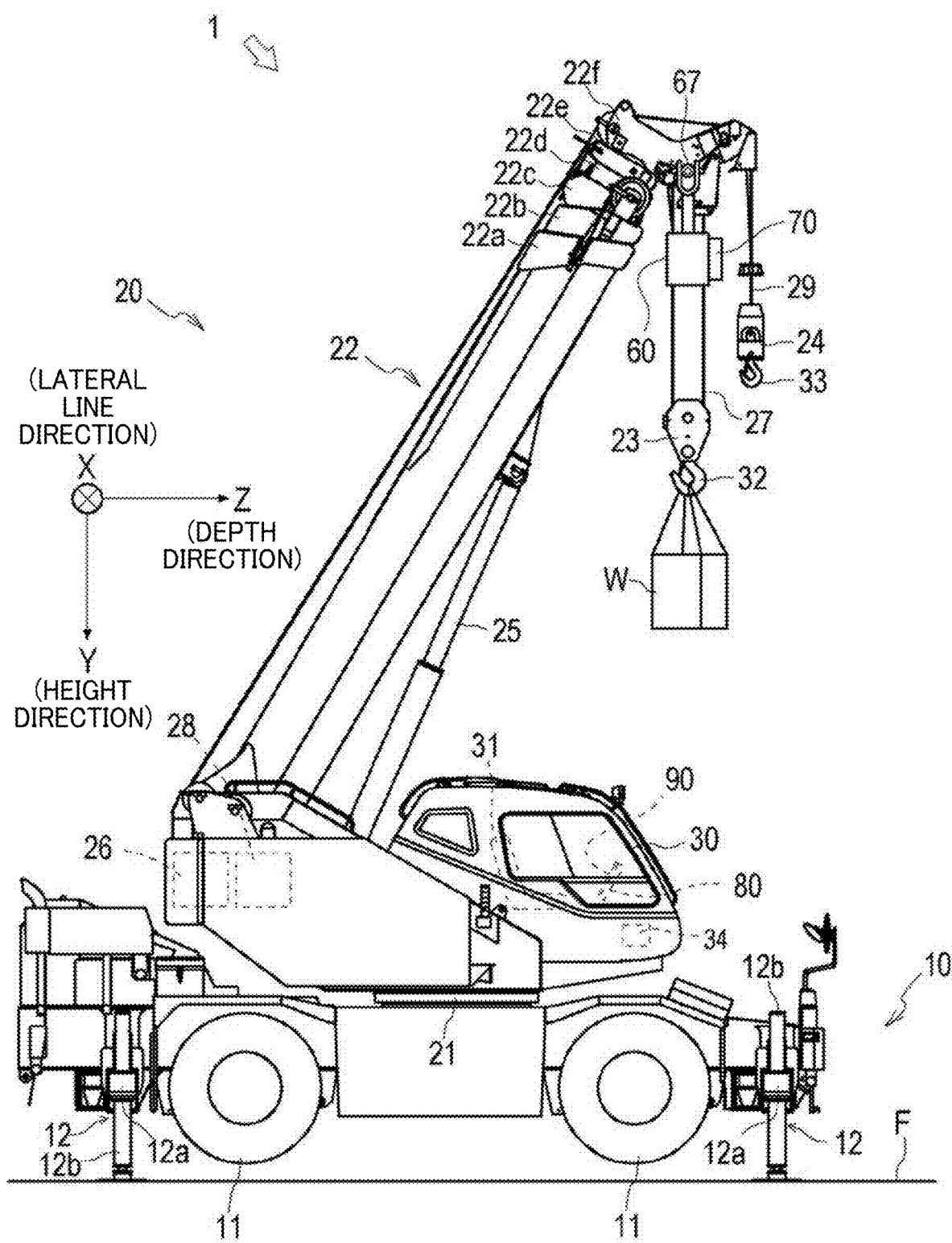
FIG. 1 is a schematic diagram illustrating the overall configuration of a crane according to an embodiment of the present invention.

As illustrated in FIG. 1, crane 1 is an example of a crane to which a guide information display device according to the embodiment of the present invention is applied.

Crane 1 is a mobile crane that can move to a desired location.

Crane 1 includes travelling vehicle 10 and crane apparatus 20.

Travelling vehicle 10 transports crane apparatus 20, has a plurality of (four in the present embodiment) wheels 11, and runs with an engine (not illustrated) acting as a power source.

Outriggers 12 are provided at the four corners of travelling vehicle 10. Outrigger 12 includes overhanging beam 12a extendable to both sides in the width direction of travelling vehicle 10 by a hydraulic pressure and hydraulic jack cylinder 12b extendable vertically relative to the ground. Travelling vehicle 10 can place crane 1 into an operable state by grounding jack cylinder 12b and extend the operable range (operating radius) of crane 1 by increasing the extended length of overhanging beam 12a.

Crane apparatus 20 hoists suspended load W with a wire rope and includes swivel base 21, extendable/retractable boom 22, main hook block 23, sub hook block 24, luffing cylinder 25, main winch 26, main wire rope 27, sub winch 28, sub wire rope 29, and cabin 30.

Swivel base 21 is configured so as to swivel crane apparatus 20 and is mounted on the frame of travelling vehicle 10 via an annular bearing. The annular bearing is disposed with the rotation center perpendicular to the installation surface of travelling vehicle 10. Swivel base 21 is configured so as to rotate about the center of the annular bearing in one direction and the other direction. Swivel base 21 is rotated by a hydraulic motor (not illustrated).

Extendable/retractable boom 22 supports the wire rope so as to hoist suspended load W. Extendable/retractable boom 22 includes base boom members 22a that are a plurality of boom members, second boom member 22b, third boom member 22c, fourth boom member 22d, fifth boom member 22e, and top boom member 22f. The boom members are telescopically inserted in decreasing order of cross-sectional areas. Extendable/retractable boom 22 is configured to axially extend and retract by moving the boom members with an extendable/retractable cylinder, which is not illustrated. Extendable/retractable boom 22 is mounted such that the base end of base boom member 22a can swivel on swivel base 21. Thus, extendable/retractable boom 22 is configured so as to horizontally rotate and swivel on the frame of travelling vehicle 10.

Main hook block 23 is configured to catch and hang suspended load W and includes a plurality of hook sheaves where main wire rope 27 is wound and main hook 32 for hanging suspended load W.

Crane apparatus 20 further includes sub hook block 24 for catching and hanging suspended load W in addition to main hook block 23. Sub hook block 24 has sub hook 33 for hanging suspended load W.

Luffing cylinder 25 luffs up and down extendable/retractable boom 22 and keeps the attitude of extendable/retractable boom 22. Luffing cylinder 25 includes a hydraulic cylinder having a cylinder part and a rod part.

Main winch 26 reels in (winds up) and out (winds down) main wire rope 27 and includes a hydraulic winch in the present embodiment.

Main winch 26 is configured such that a main drum having wound main wire rope 27 is rotated by a main hydraulic motor. Main winch 26 is configured such that main wire rope 27 wound around the main drum is reeled out by feeding hydraulic oil so as to rotate the main hydraulic motor in one direction and main wire rope 27 is reeled in and wound around the main drum by feeding hydraulic oil so as to rotate the main hydraulic motor in the other direction.

Sub winch 28 reels in and out sub wire rope 29 and includes a hydraulic winch in the present embodiment.

Cabin 30 covers operator's seat 31 for a seated operator and is provided on a side of extendable/retractable boom 22 on swivel base 21.

Crane 1 configured thus can move crane apparatus 20 to any position by running travelling vehicle 10 and extend extendable/retractable boom 22 to any extended/retracted boom length by raising extendable/retractable boom 22 to any luffing angle by means of luffing cylinder 25.

Moreover, crane 1 includes controller 34 that controls the operations of, for example, swivel base 21, extendable/retractable boom 22, and luffing cylinder 25 (that is, the operations of crane 1). Controller 34 can output information on operating states of, for example, swivel base 21, extendable/retractable boom 22, and luffing cylinder 25, information on performance unique to crane 1, and the weight of suspended load W and the like.

In the present explanation, an XYZ coordinate system is defined as illustrated in FIG. 1 with respect to the axial direction of the luffing fulcrum of extendable/retractable boom 22 (this holds true also in the following explanation).

Figure 2:
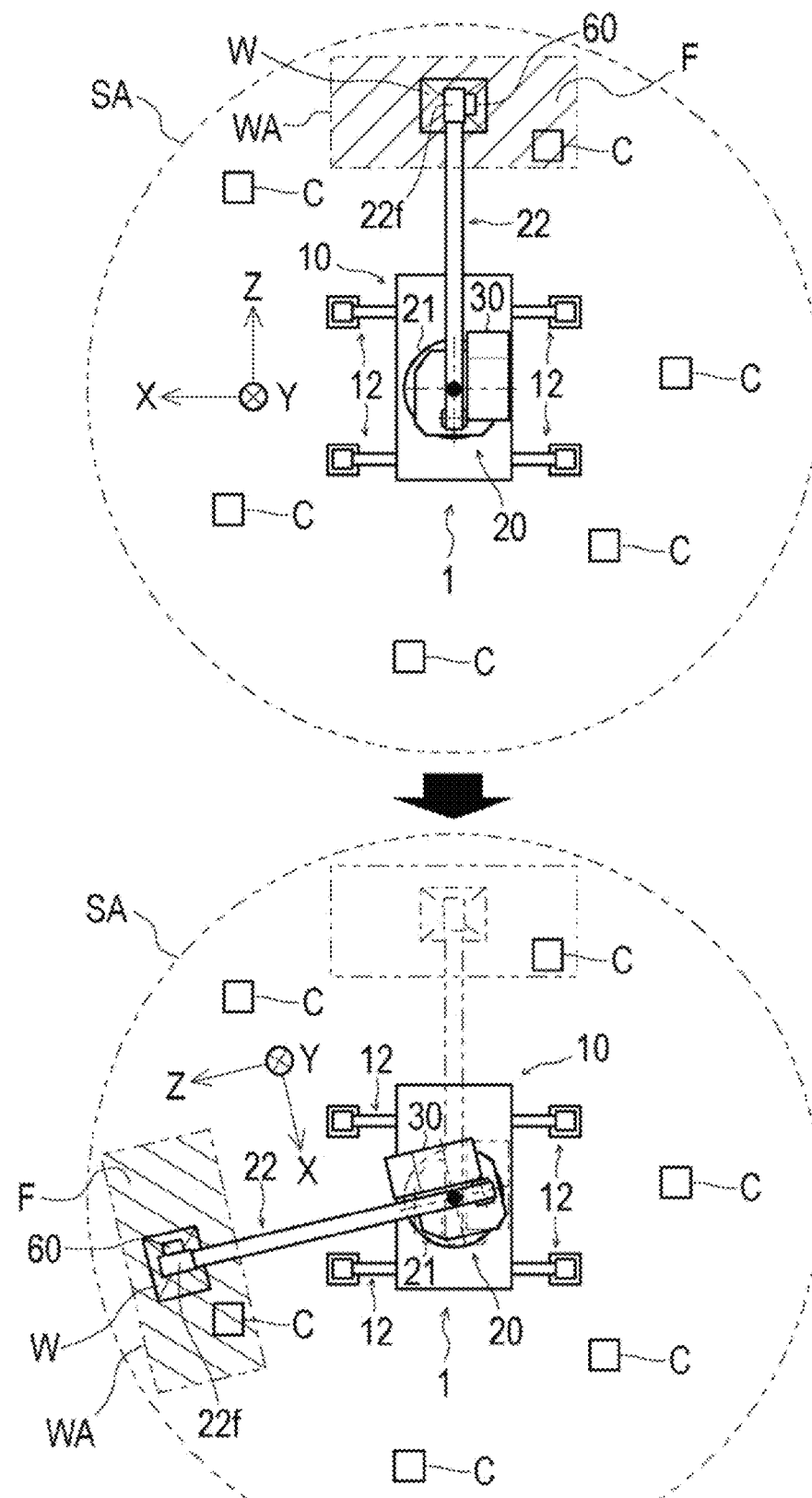
FIG. 2 is a plan schematic diagram for explaining a suspended load area.

The X-axis direction (also referred to as a lateral line direction) is a horizontal direction parallel to the axial direction of the luffing fulcrum of extendable/retractable boom 22. The Y-axis direction (also referred to as a height direction) is a vertical direction. Furthermore, the Z-axis direction (also referred to as a depth direction) is a horizontal direction perpendicular to the axial direction of the luffing fulcrum of extendable/retractable boom 22. In other words, as illustrated in FIG. 2, the XYZ coordinate system is defined as a local coordinate system with reference to extendable/retractable boom 22.

The guide information display device according to the embodiment of the present invention will be described below.

Figure 3:
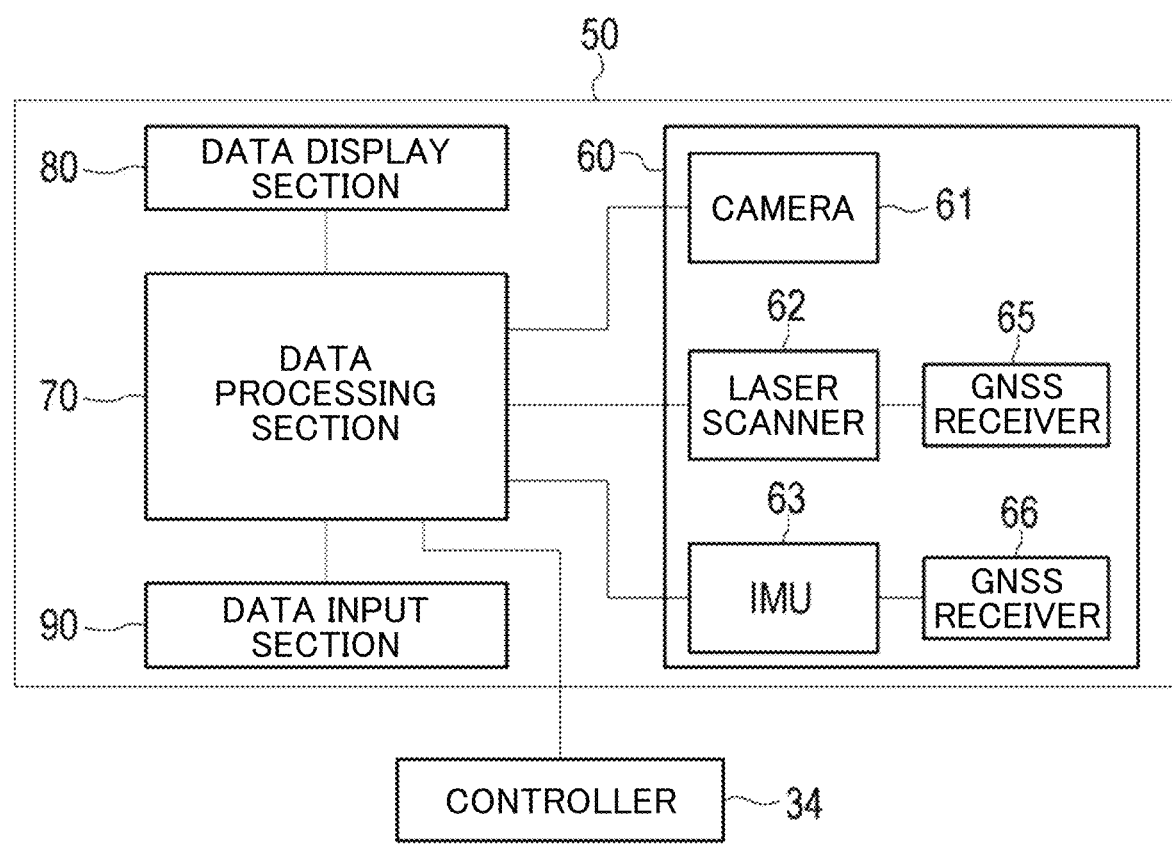
FIG. 3 is a schematic diagram illustrating the overall configuration of the guide information display device according to the embodiment of the present invention.

Crane 1 includes guide information display device 50 as illustrated in FIG. 3.

Guide information display device 50 is an example of the guide information display device according to the present invention. The guide information display device is a device for displaying an image of information (hereinafter, will be referred to as guide information) on an area including suspended load W (hereinafter, will be referred to as suspended load area WA) and indicating the information to an operator in order to efficiently and safely operate crane 1 illustrated in FIG. 1.

Figure 4:
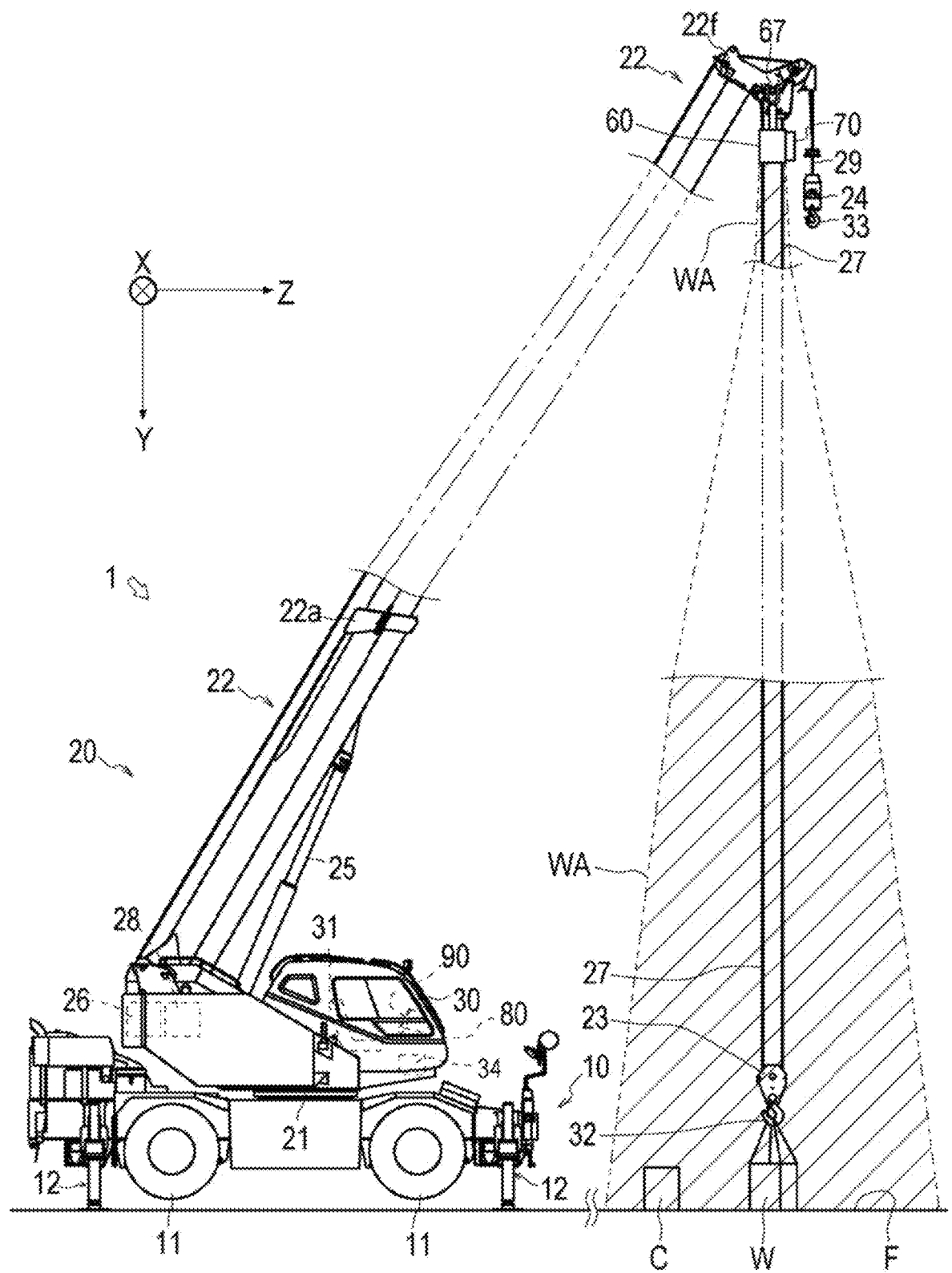
FIG. 4 is a side schematic diagram for explaining the suspended load area.

As illustrated in FIGS. 2 and 4, "suspended load area WA" is set as an area including suspended load W when viewed in the Y-axis direction in work area SA of crane 1. The work area is an area where "guide information" is generated.

"Suspended load area WA" is set as an area including an area directly under top boom member 22f of extendable/retractable boom 22 of crane 1. Suspended load W, ground surface F, and ground object C in suspended load area WA are to be measured by guide information display device 50. "Suspended load area WA" changes in response to a swiveling operation, a luffing operation, and extending and retracting operations of extendable/retractable boom 22.

Moreover, "guide information" assists the determination of an operator who evaluates the length, the swiveling position, and the luffing angle of extendable/retractable boom 22 and the feeding amount of the wire rope when transporting suspended load W by crane 1. The information includes image information on suspended load area WA, information on the shapes of suspended load W and ground object C, height information on suspended load W, height information on ground object C. and information on the path of suspended load W.

As illustrated in FIGS. 3 and 4, guide information display device 50 includes data acquisition section 60, data processing section 70, data display section 80, and data input section 90.

Data acquisition section 60 is a section that acquires data necessary for generating guide information in suspended load area WA. As illustrated in FIG. 3, data acquisition section 60 includes camera 61, laser scanner 62, and inertial measurement unit (IMU) 63.

As illustrated in FIG. 4, data acquisition section 60 is attached to top boom member 22f positioned at the distal end of extendable/retractable boom 22 of crane 1 and is placed so as to capture a state immediately under data acquisition section 60 from the boom distal end immediately above suspended load W. "Immediately above" means a concept including a position vertically above suspended load W and a position in a certain range (for example, the range of the top surface of suspended load W) defined with reference to the position vertically above suspended load W.

Data acquisition section 60 is attached to top boom member 22f of the distal end part of extendable/retractable boom 22 via gimbal 67 (see FIG. 1). Data acquisition section 60 is configured so as to keep a substantially fixed attitude (directed in the Y-axis direction) when extendable/retractable boom 22 performs a luffing operation, a swiveling operation, and extending and retracting operations. Thus, camera 61 and laser scanner 62 can be always directed to suspended load W. With this configuration, data acquisition section 60 can always acquire data from suspended load W and ground surface F (that is, suspended load area WA) under suspended load W by means of camera 61 and laser scanner 62. If ground object C is present in suspended load area WA, data on ground object C can be acquired by camera 61 and laser scanner 62.

Figure 5A:
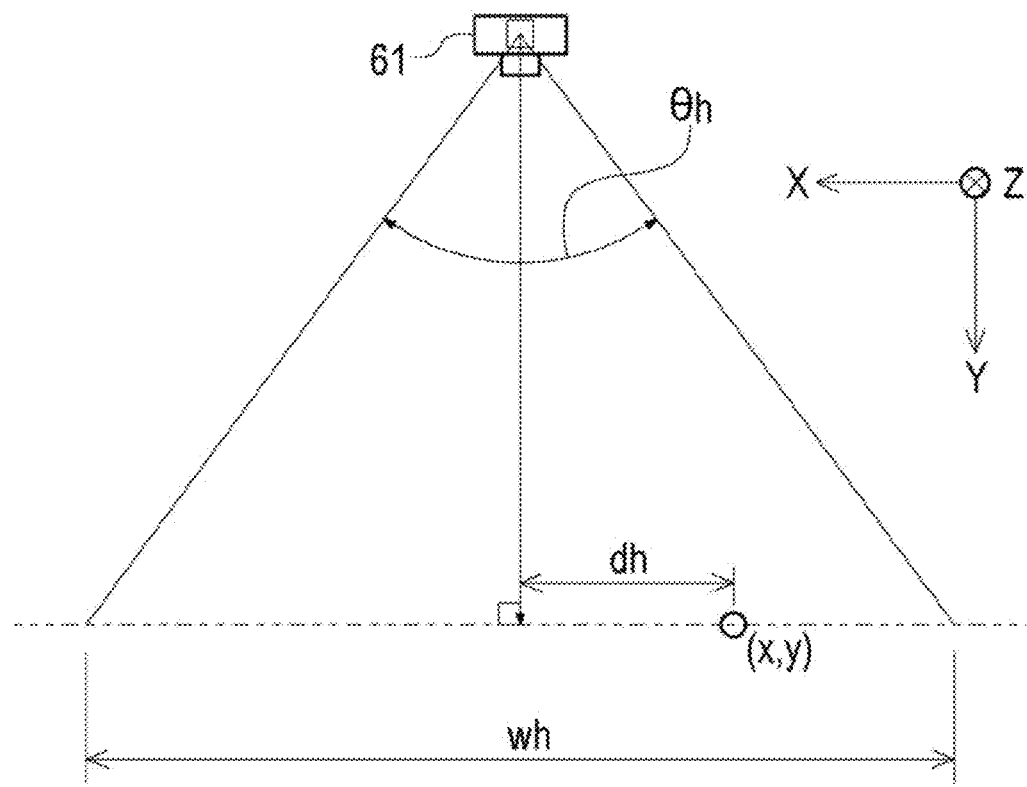
FIGS. 5A and 5B are explanatory drawings of a camera-space coordinate system and the angle of view of a camera.
Figure 5B:
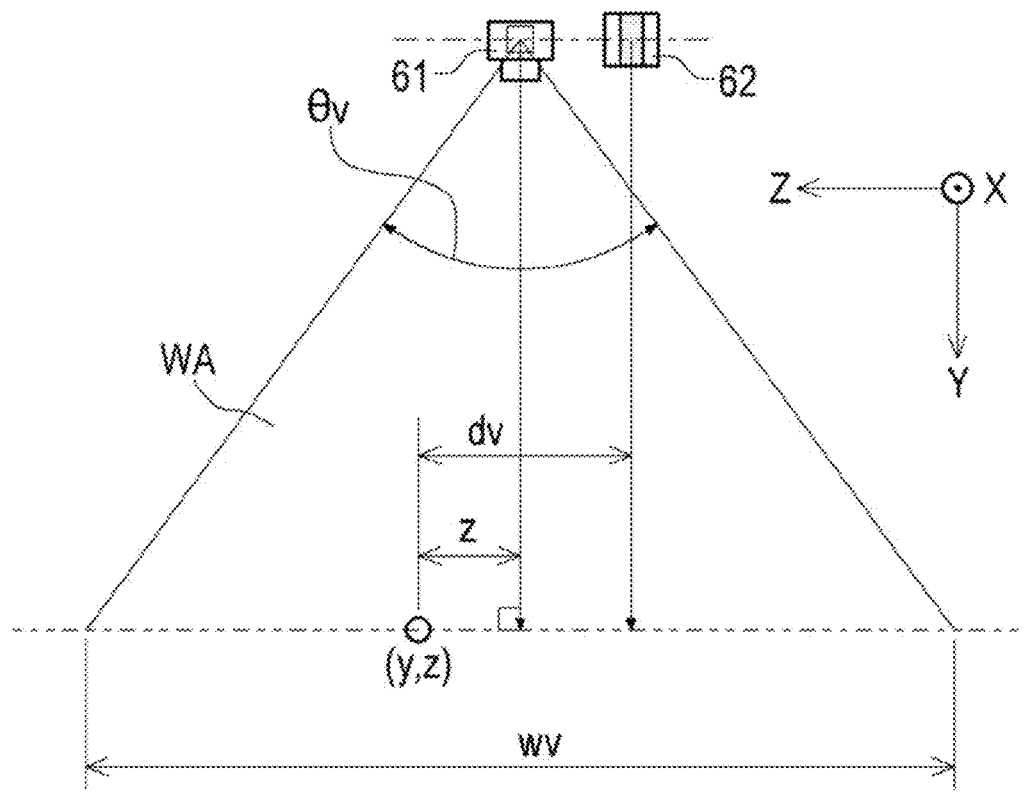

As illustrated in FIGS. 5A and 5B, camera 61 is a digital video camera for capturing video of suspended load area WA. Camera 61 has the function of outputting taken video to the outside in real time. Camera 61 has angles of view (horizontal angle of view θh and vertical angle of view θv) as illustrated in FIGS. 5A and 5B. Furthermore, camera 61 has the number of pixels, a frame rate, and an image transmission rate in consideration of a data amount necessary for generating suitable guide information.

As illustrated in FIG. 3, laser scanner 62 is an apparatus that radiates laser light to a measuring object and receives reflected light from the measuring object of the laser light so as to acquire information on a reflecting point and acquire point cloud data on the measuring object. The measuring object of laser scanner 62 is suspended load W, ground object C, or ground surface F. Moreover, first GNSS receiver 65 for acquiring a measurement time is connected to laser scanner 62.

In guide information display device 50, laser scanner 62 two-dimensionally acquires three-dimensional point cloud data in real time.

Figure 6A:
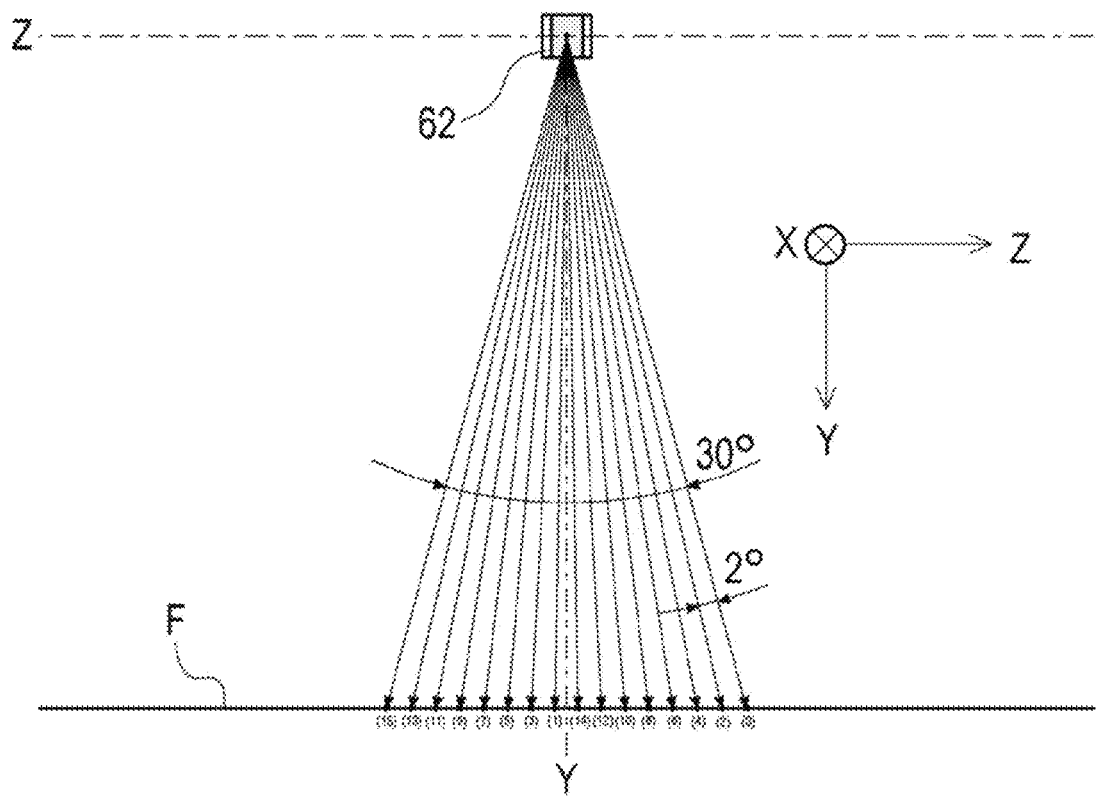
FIGS. 6A and 6B are explanatory drawings of a state of laser radiation by a laser scanner, FIG. 6A illustrating a schematic diagram viewed in the X-axis direction.
Figure 6B:
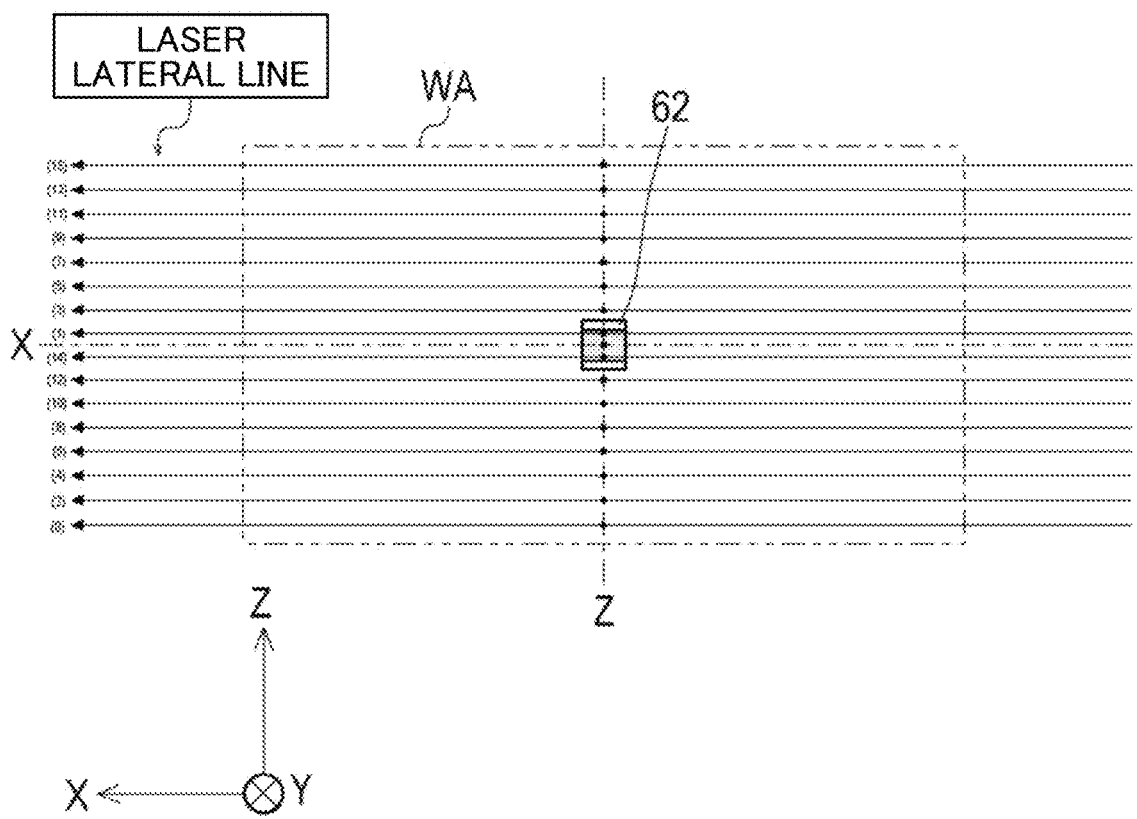

As illustrated in FIGS. 6A and 6B, laser scanner 62 includes 16 laser transmitting/receiving sensors in total. Laser scanner 62 can simultaneously radiates 16 laser beams to the measuring object and acquire point cloud data on the measuring object. The 16 laser transmitting/receiving sensors of laser scanner 62 are each disposed at a radiation angle of 2° difference in the Z-axis direction and are configured so as to radiate laser light to the measuring object with a radiation angle of 30°. Moreover, the laser transmitting/receiving sensors of laser scanner 62 are configured so as to rotate 360° (at each azimuth angle) about the Z axis. In the following explanation, trails drawn by laser light radiated to suspended load area WA will be referred to as laser lateral lines. The laser lateral lines are parallel to the X-axis direction. Laser scanner 62 draws 16 laser lateral lines at the same time.

Laser scanner 62 is disposed such that the laser lateral lines are parallel to the X-axis direction. Moreover, laser scanner 62 has a reference axis for changing the radiation angle of laser light, the reference axis being parallel to the Z-axis direction.

As illustrated in FIG. 3, inertial measurement unit (hereinafter, will be referred to as IMU) 63 is an apparatus for acquiring attitude data on camera 61 and laser scanner 62 during data acquisition. IMU 63 can measure an attitude angle in real time and has measurement accuracy usable for correcting point cloud data acquired by laser scanner 62.

Moreover, second GNSS receiver 66 for acquiring a measurement time is connected to IMU 63.

Figure 7A:
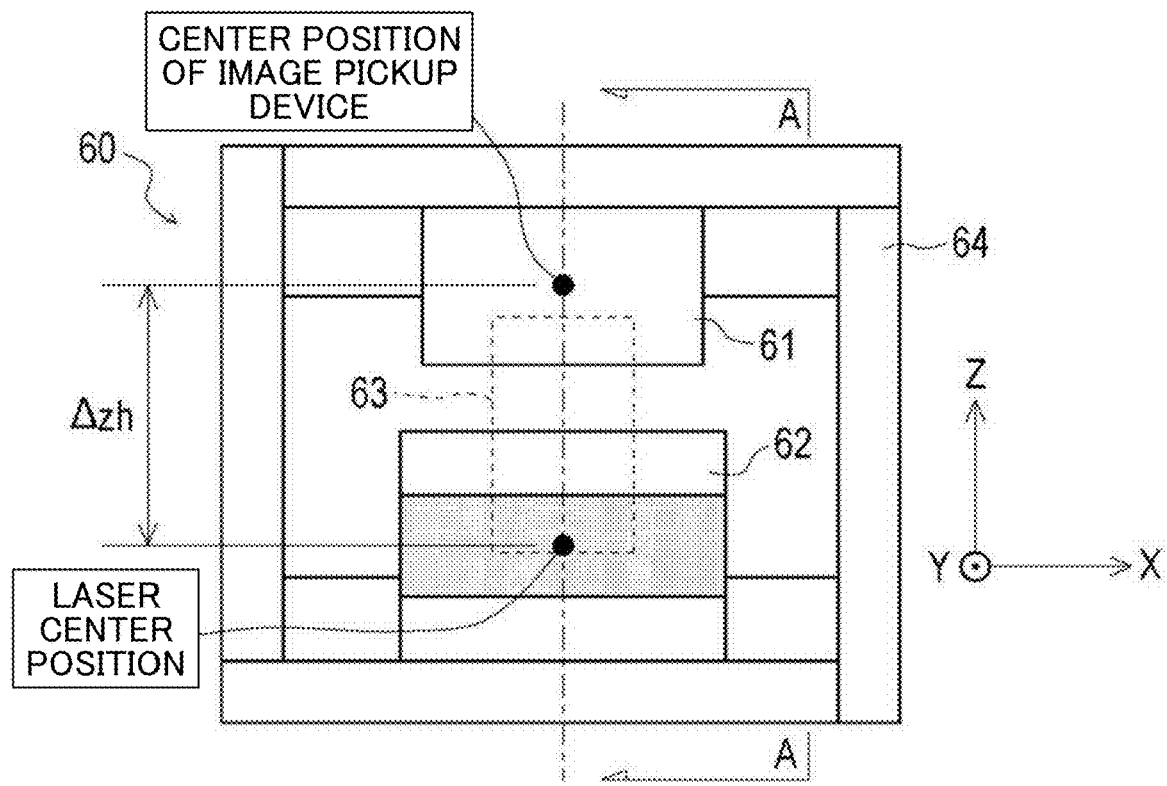
FIGS. 7A and 7B are schematic diagrams of a data acquisition section, FIG. 7A illustrating a bottom view in the Y-axis direction, FIG. 7B illustrating a cross-sectional view taken along line A-A of FIG. 7A.
Figure 7B:
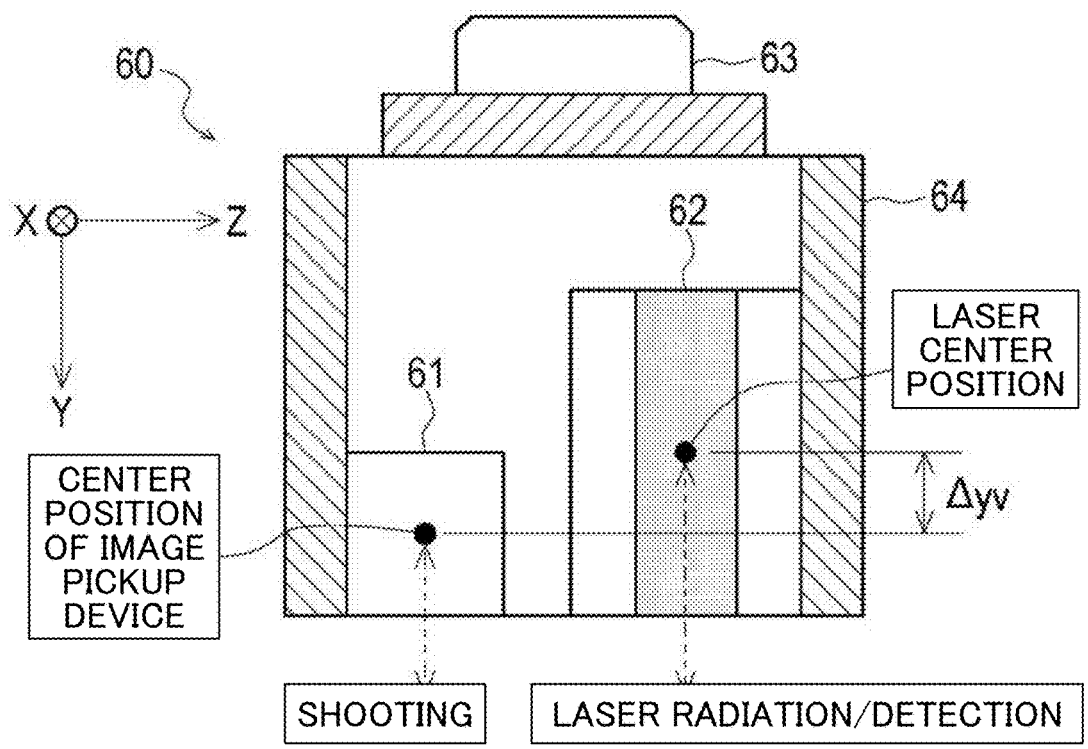

As illustrated in FIGS. 7A and 7B, data acquisition section 60 is an integrated sensor unit of camera 61, laser scanner 62, and inertial measurement unit (IMU) 63 that are fixed to frame unit 64.

Frame unit 64 is an object that is substantially shaped like a rectangular parallelepiped and includes five combined plates. Frame unit 64 is configured such that the four plates form the four sides of the rectangular parallelepiped, the other plate forms the top surface of the rectangular parallelepiped, and an opening is formed at the bottom of the rectangular parallelepiped. In data acquisition section 60, camera 61 and laser scanner 62 are provided inside the sides of frame unit 64 and IMU 63 is provided on the top surface of frame unit 64. As illustrated in FIG. 7A, the center position of an image pickup device of camera 61 and the laser center position of laser scanner 62 are separated from each other by distance Δzh in the Z-axis direction when viewed in the Y-axis direction. The laser center position is the rotation center of laser in laser scanner 62. The laser center position is located on the Z axis.

As illustrated in FIG. 7B, the center position of the image pickup device of camera 61 and the laser center position of laser scanner 62 are separated from each other by distance Δyv in the Y-axis direction when viewed in the X-axis direction.

Data acquisition section 60 is disposed such that the four sides of frame unit 64 are opposed to each other in pairs, one of the paired sides is perpendicular to the Z axis, and the other side is perpendicular to the X axis. Furthermore, data acquisition section 60 is disposed such that the top surface of frame unit 64 is perpendicular to the Y axis.

A method of converting the X coordinate of point (x, y) in the XYZ coordinate system into an Xc coordinate in a camera-space coordinate system will be described below.

In guide information display device 50, coordinate values are converted between the XYZ coordinate system and the camera-space coordinate system in order to display guide information GD, which will be described later, on data display section 80 while guide information GD is superimposed on image M captured by camera 61. In guide information display device 50, three-dimensional camera-space coordinate system Xc·Yc·Zc is defined in the image space of camera 61.

As illustrated in FIG. 5A, dh is a distance from a perpendicular line extending from the lens center of camera 61 to point (x, y) in the X-axis direction and wh is the maximum screen width of camera 61 in the horizontal direction.

Furthermore, x of point (x, y) is a position from the center of the screen in the X-axis direction. At this point, the Xc coordinate of point (x, y) in the camera space is expressed by following Expressions (1) and (2).

In the following expressions, $\Delta zh$ is a difference between the position of an image pickup device of camera 61 and the laser center position in the horizontal direction (see FIG. 7A), wh is the breadth of a camera image, $\theta h$ is the horizontal angle of view of camera 61, and tmp1 is a temporary variable.

$$tmp1=(y-\Delta zh)\times\tan(\pi\times\theta h/360) \quad (1)$$

$$Xc=wh/2-wh\times x/(2\times tmp1) \quad (2)$$

A method of converting the Z coordinate of point (y, z) in the XYZ coordinate system into a Zc coordinate in the camera-space coordinate system will be described below.

As illustrated in FIG. 5B, dv is a distance from point (y, z) to the lens center in the Z-axis direction and wv is the maximum screen width of camera 61 in the horizontal direction. Furthermore, z of point (y, z) is a position from the center of the screen in the Z-axis direction. At this point, the Zc coordinate of point (y, z) in the camera space is expressed by following Expressions (3) and (4).

In the following expressions, $\Delta yv$ is a difference between the position of an image pickup device of camera 61 and the laser center position of laser scanner 62 in the vertical direction (see FIG. 7B), wv is the length of a camera image, $\theta v$ is the vertical angle of view of camera 61, and tmp2 is a temporary variable.

$$tmp2=Y\times\tan(\pi\times\theta v/360) \quad (3)$$

$$Zc=wv/2+wv\times(Z-\Delta yv)/(2\times tmp2) \quad (4)$$

In guide information display device 50, the coordinates of point cloud data acquired by laser scanner 62 or the like in the XYZ coordinate system are converted to the coordinates of the camera-space coordinate system by using Expressions (1) to (4), thereby displaying guide information GD positioned on image M captured by camera 61.

As laser scanner 62, an apparatus capable of measuring the three-dimensional shape of a measuring object from the maximum height (for example, about 100 m) of extendable/retractable boom 22 is selected in consideration of the maximum height.

Furthermore, as laser scanner 62, an apparatus having predetermined performance for specifications such as a measurement speed, the number of measurement points, and the accuracy of measurement is selected in consideration of a data amount and data accuracy that are necessary for generating proper guide information.

In the present embodiment, laser scanner 62 including 16 laser transmitting/receiving sensors in total is used. The guide information display device according to the present invention is not limited depending upon the number of laser transmitting/receiving sensors constituting the laser scanner. In other words, in the guide information display device according to the present invention, any laser scanner with optimum specifications is selected according to, for example, the maximum height of the boom (jib) of the crane.

Data acquired in suspended load area WA by data acquisition section 60 includes image data acquired by capturing suspended load W, ground surface F under suspended load W. and ground object C around suspended load W by means of camera 61.

Moreover, data acquired in suspended load area WA by data acquisition section 60 includes point cloud data acquired by scanning suspended load W, ground surface F, and ground object C by means of laser scanner 62. In this case, ground surface F widely includes a sender of suspended load W and a surface at the receiver and also includes the rooftop floor of a building and a roof surface or the like as well as a ground surface.

As illustrated in FIG. 3, data processing section 70 is a section for processing data acquired by data acquisition section 60 and generating guide information GD to be presented to an operator. In the present embodiment, data processing section 70 includes a general-purpose personal computer having a predetermined data processing program installed on the computer.

Moreover, data processing section 70 is electrically connected to controller 34 of crane 1 and receives "crane information" outputted from controller 34.

Data display section 80 is a section for displaying guide information GD to be presented to an operator. Data display section 80 includes a display device connected to data processing section 70.

Figure 8A:
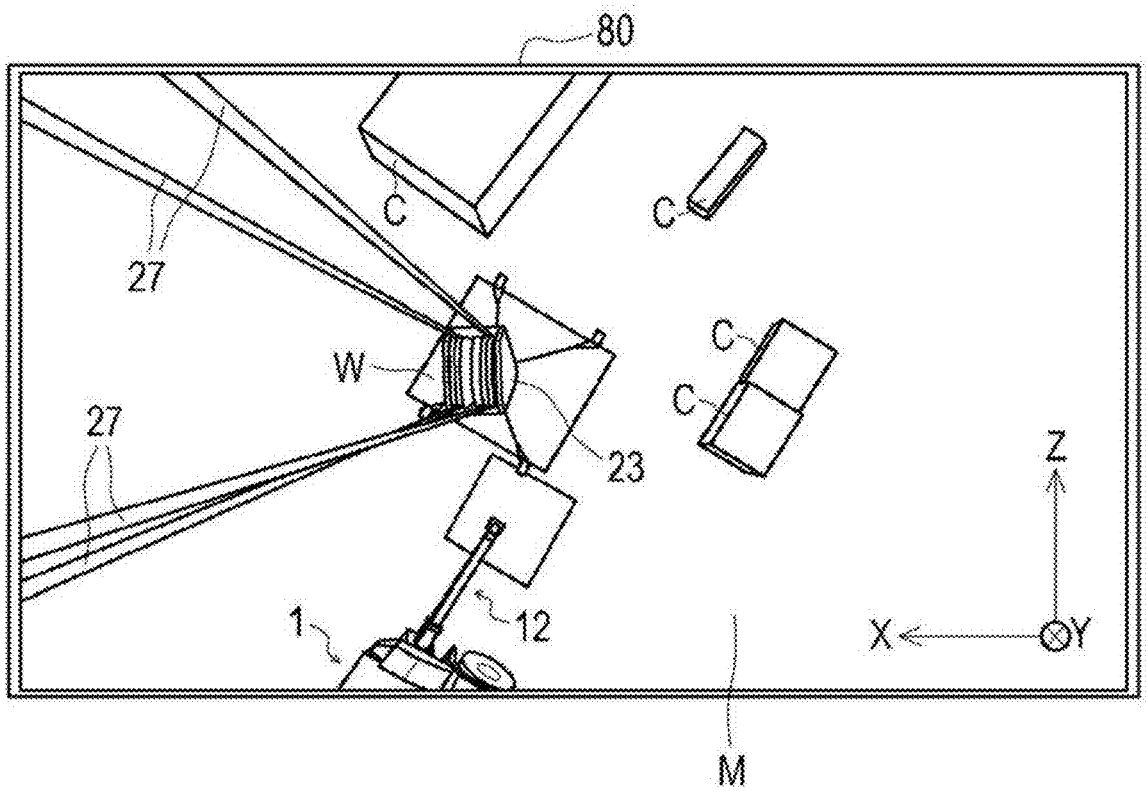
FIGS. 8A and 8B illustrate a display state of guide information.

As illustrated in FIG. 8A, image M of suspended load area WA captured by camera 61 is displayed in real time by data display section 80.

Figure 8B:
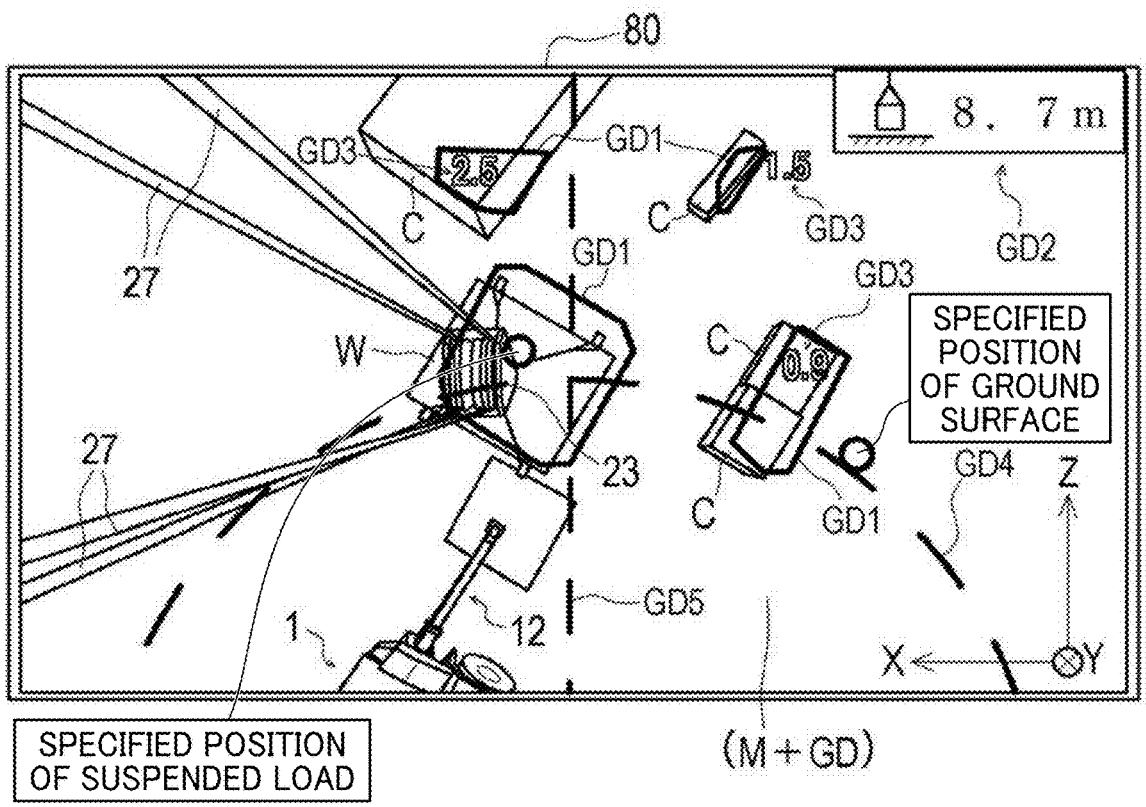

As illustrated in FIG. 8B, guide information GD includes guide frame GD1 illustrating the outside shapes of suspended load W and ground object C in the Y-axis direction, height information GD2 of the underside of suspended load W, height information GD3 of the top surface of ground object C, operating radius information GD4 indicating the path of suspended load W, axis information GD5 indicating the axial direction of extendable/retractable boom 22 and the like.

Furthermore, data display section 80 displays guide information GD generated by data processing section 70 and image M while superimposing guide information GD and image M.

As illustrated in FIG. 3, data input section 90 is a section for inputting a set value or the like to data processing section 70 and includes a touch panel, a mouse, a keyboard and the like.

Figure 9A:
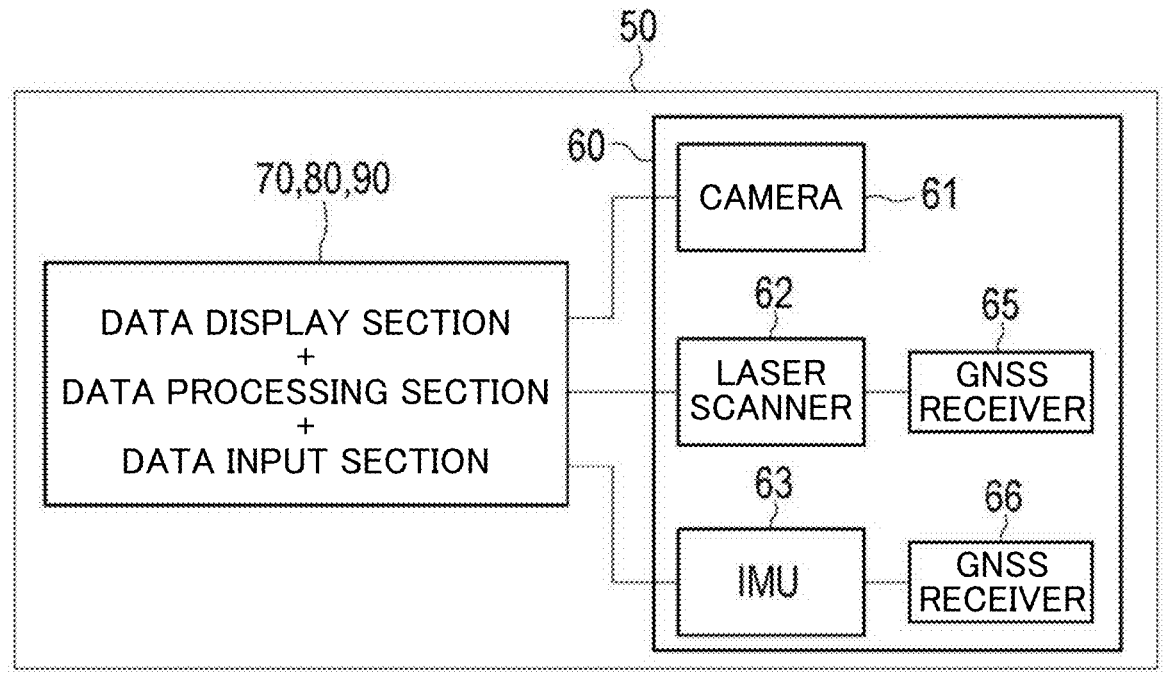
FIGS. 9A and 9B are schematic diagrams of another configuration of the guide information display device, FIG. 9A illustrating a data processing section, the data display section, and a data input section that are configured in a tablet PC, FIG. 9B illustrating the data display section and the data input section that are configured in a touch-panel display device.
Figure 9B:
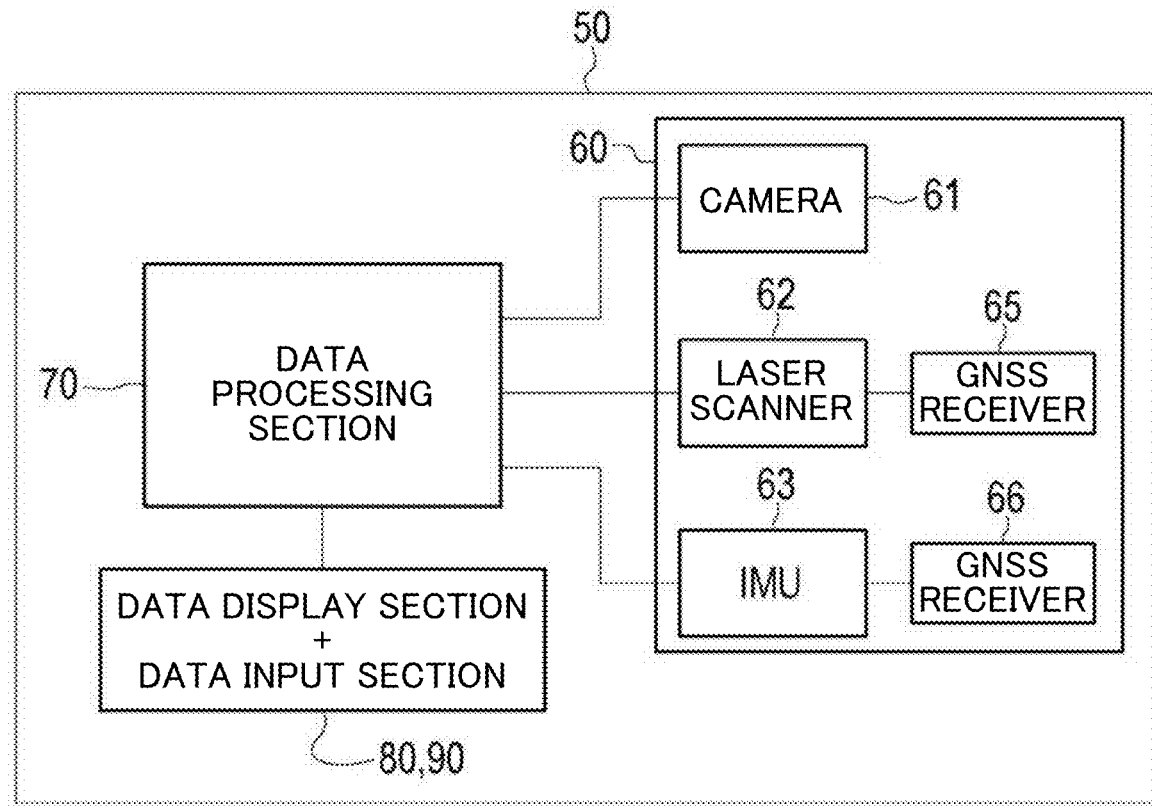

As illustrated in FIG. 9A, in guide information display device 50, data processing section 70, data display section 80, and data input section 90 are preferably integrated by a general-purpose tablet personal computer (hereinafter, will be also referred to as a tablet PC). As illustrated in FIG. 9B, in guide information display device 50, data display section 80 and data input section 90 may be integrated by a touch-panel display device and data processing section 70 acting as a general-purpose PC may be connected to the touch-panel display device.

As illustrated in FIG. 4, data display section 80 and data input section 90 are disposed so as to be viewable to an operator at the front of operator's seat 31 in cabin 30. Data processing section 70 is preferably disposed near data acquisition section 60. If data processing section 70, data display section 80, and data input section 90 are integrated by a tablet PC, data processing section 70 may be disposed in cabin 30.

Data is preferably transmitted between data acquisition section 60 and data processing section 70 via a wired LAN. Alternatively, data may be transmitted between data acquisition section 60 and data processing section 70 via a wireless LAN or power line communications.

As illustrated in FIG. 9A, in guide information display device 50, data processing section 70, data display section 80, and data input section 90 are preferably integrated by a general-purpose tablet personal computer (hereinafter, will be also referred to as a tablet PC). As illustrated in FIG. 9B, in guide information display device 50, data display section 80 and data input section 90 may be integrated by a touch-panel display device and data processing section 70 acting as a general-purpose PC may be connected to the touch-panel display device.

A status of data acquisition by data acquisition section 60 will be described below.

In data acquisition section 60, suspended load area WA is successively captured by camera 61 and image M of suspended load area WA is acquired.

Figure 10:
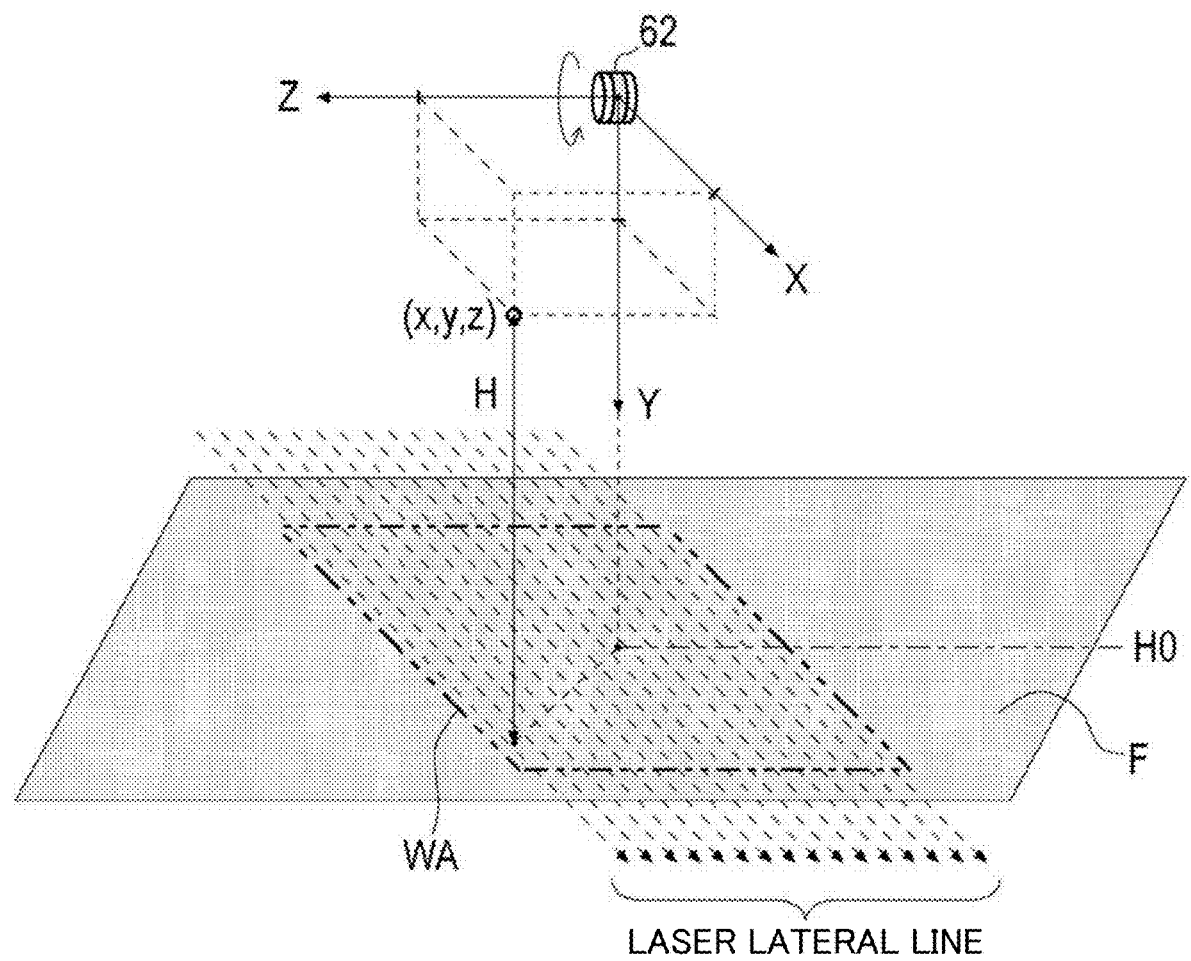
FIG. 10 is a schematic diagram showing the relationship between the suspended load area and laser lateral lines.
Figure 11:
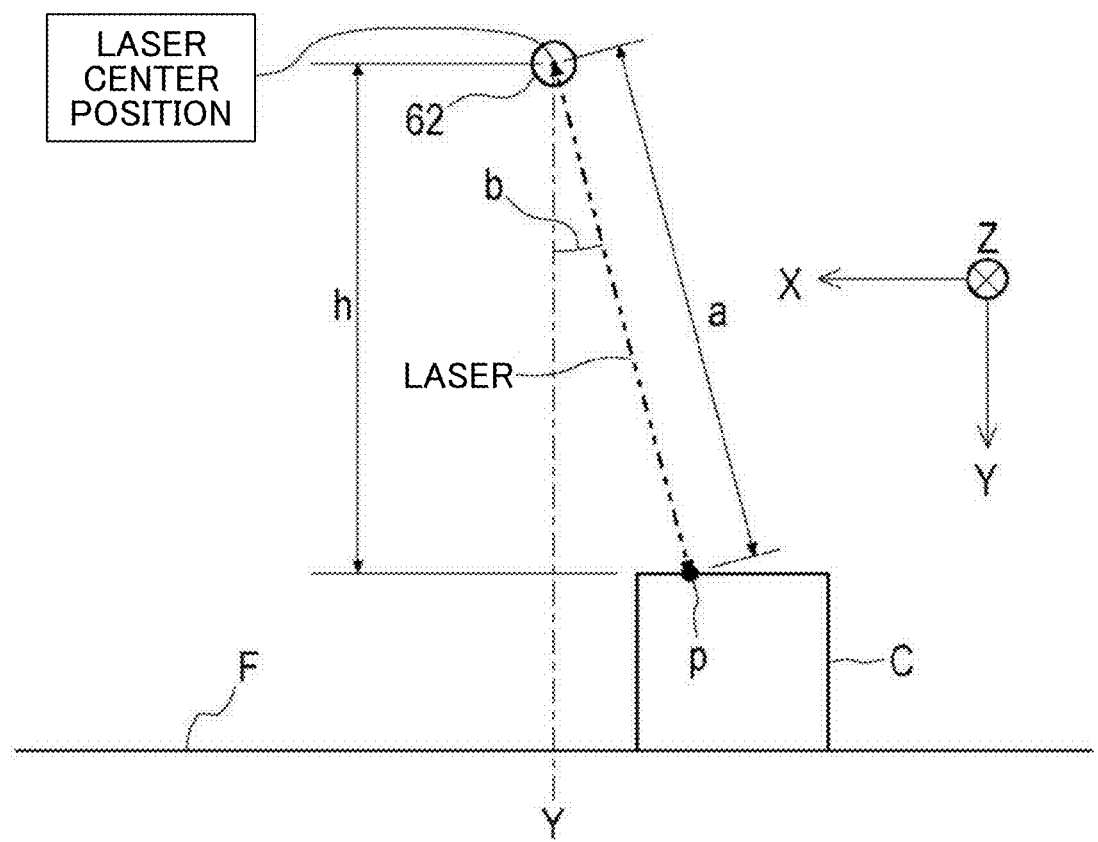
FIG. 11 is a schematic diagram viewed in the Z-axis direction, explaining a state of laser radiation by the laser scanner.

As illustrated in FIG. 10, in data acquisition section 60, suspended load area WA is successively scanned by laser scanner 62 and point cloud data on a measuring object in suspended load area WA is acquired. Hereinafter, point cloud data acquired by laser scanner 62 will be referred to as point cloud data P. Point cloud data P is a set of point data p. Point data p indicates points on ground surface F, suspended load W, and the top surface of ground object C in suspended load area WA. As illustrated in FIG. 11, point data p includes information on distance a from a measuring object (for example, ground object C) to laser scanner 62 and radiation angle b of laser scanner 62 when point data p is acquired.

As illustrated in FIG. 3, first GNSS receiver 65 is connected to laser scanner 62. First GNSS receiver 65 receives time information from a plurality of positioning satellites while acquiring point cloud data P. Data processing section 70 adds information on the acquisition time of point data p to point data p. In other words, information on point data p includes acquisition time tp in addition to distance a and radiation angle b.

In data acquisition section 60, laser scanner 62 acquires point cloud data P; meanwhile, IMU 63 acquires attitude data Q on laser scanner 62 with a predetermined period. Attitude data Q includes information on angles with respect to the X-axis, Y-axis, and Z-axis directions of laser scanner 62 and accelerations. The acquisition period of attitude data Q acquired by IMU 63 is set shorter than the acquisition period of point cloud data P acquired by laser scanner 62. Attitude data Q is a set of individual attitude data q that is measured in each measuring period.

Second GNSS receiver 66 is connected to IMU 63. Second GNSS receiver 66 receives time information from a plurality of positioning satellites while acquiring attitude data Q. Data processing section 70 adds acquisition time tq as information on the acquisition time of individual attitude data q to individual attitude data q. In other words, information on individual attitude data q includes acquisition time tq.

Figure 12:
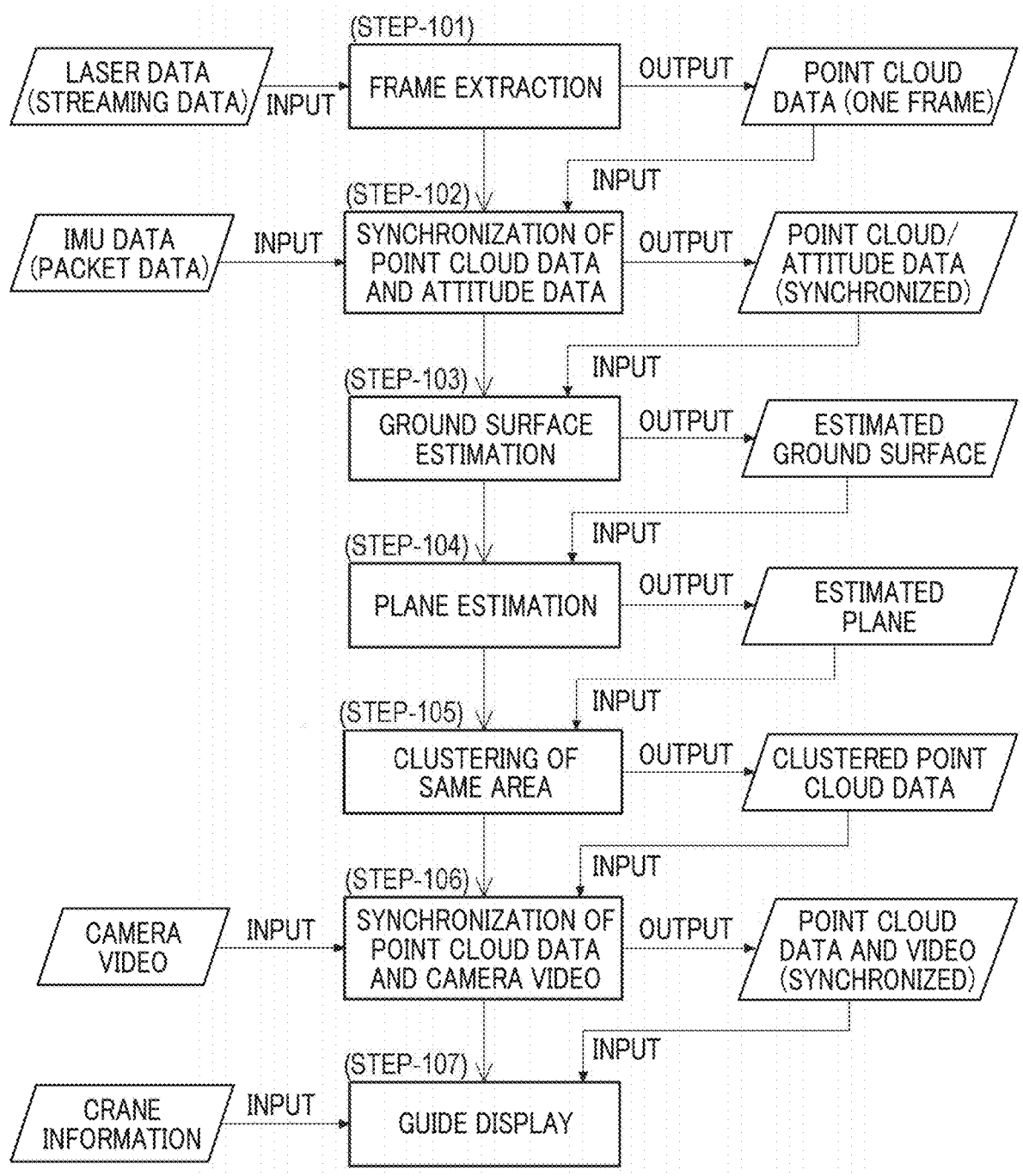
FIG. 12 is a flowchart of a flow of data processing by a data processing section.

A status of data processing by data processing section 70 will be described below:

As indicated in FIG. 12, "frame extraction" is first performed in data processing by data processing section 70 (STEP-101).

In data processing on point cloud data P by data processing section 70, point cloud data P for one frame is extracted and outputted from the stream data of point cloud data P. Point cloud data P of one frame is a set of point data p that is acquired while the direction of laser radiation from laser scanner 62 rotates once about the Z axis.

As illustrated in FIG. 12, "synchronous processing on point cloud data and attitude data" is subsequently performed in data processing by data processing section 70 (STEP-102).

Data processing section 70 synchronizes point data p included in point cloud data P of one frame with attitude data Q acquired by IMU 63.

Specifically, point data p is synchronized by searching for acquisition time tq of individual attitude data q closest to acquisition time tp of individual point data p and associating individual attitude data q in acquisition time tq with point data p.

Thereafter, data processing section 70 outputs point data p synchronized with individual attitude data q.

As illustrated in FIG. 11, data processing section 70 calculates distance h from the laser center position of laser scanner 62 to point data p based on distance a and radiation angle b. "Distance h" is a distance from the laser center position of laser scanner 62 to a horizontal surface having point data p.

When distance h of point data p is calculated in data processing section 70, the distance is corrected by using individual attitude data q corresponding to point data p. This can eliminate an error caused by the attitude of laser scanner 62, thereby calculating distance h of point data p with higher accuracy.

Specifically, in guide information display device 50, data acquisition section 60 includes IMU 63 that acquires attitude data Q of laser scanner 62 and data processing section 70 corrects point cloud data P based on attitude data Q of laser scanner 62 after attitude data Q is acquired by IMU 63.

With this configuration, guide information display device 50 can present more accurate guide information GD to an operator.

Figure 13A:
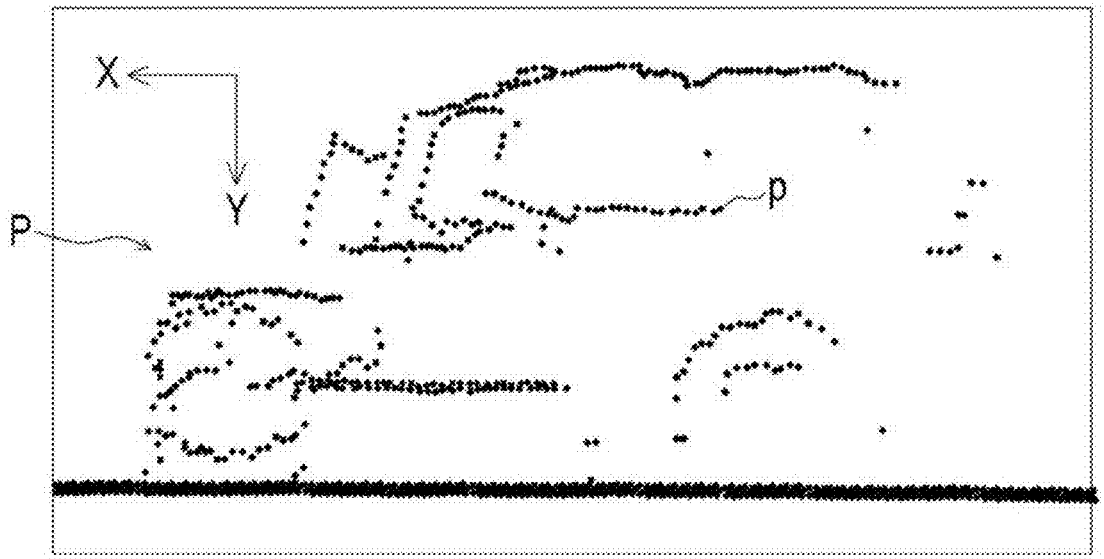
FIGS. 13A and 13B indicate point cloud data acquired by the data acquisition section, FIG. 13A indicating a plot of the point cloud data in an XYZ coordinate system, FIG. 13B indicating groups of the point cloud data plotted in the XYZ coordinate system.

FIG. 13A is a plot of point cloud data P of one frame in the XYZ coordinate system. FIG. 13A indicates point cloud data P (a set of point data p) viewed in the Z-axis direction.

As indicated in FIG. 12, "ground surface estimation" is then performed in data processing by data processing section 70 (STEP-103). Data processing section 70 estimates ground surface F.

The estimation of ground surface F with reference to a specific position on an image will be first described below. In this case, a specific position on an image is manually specified by an operator. Data processing section 70 may automatically determine and specify a specific position on an image.

In guide information display device 50, data display section 80 and data input section 90 specify the position of the ground surface, thereby determining ground surface F as a reference.

Figure 14:
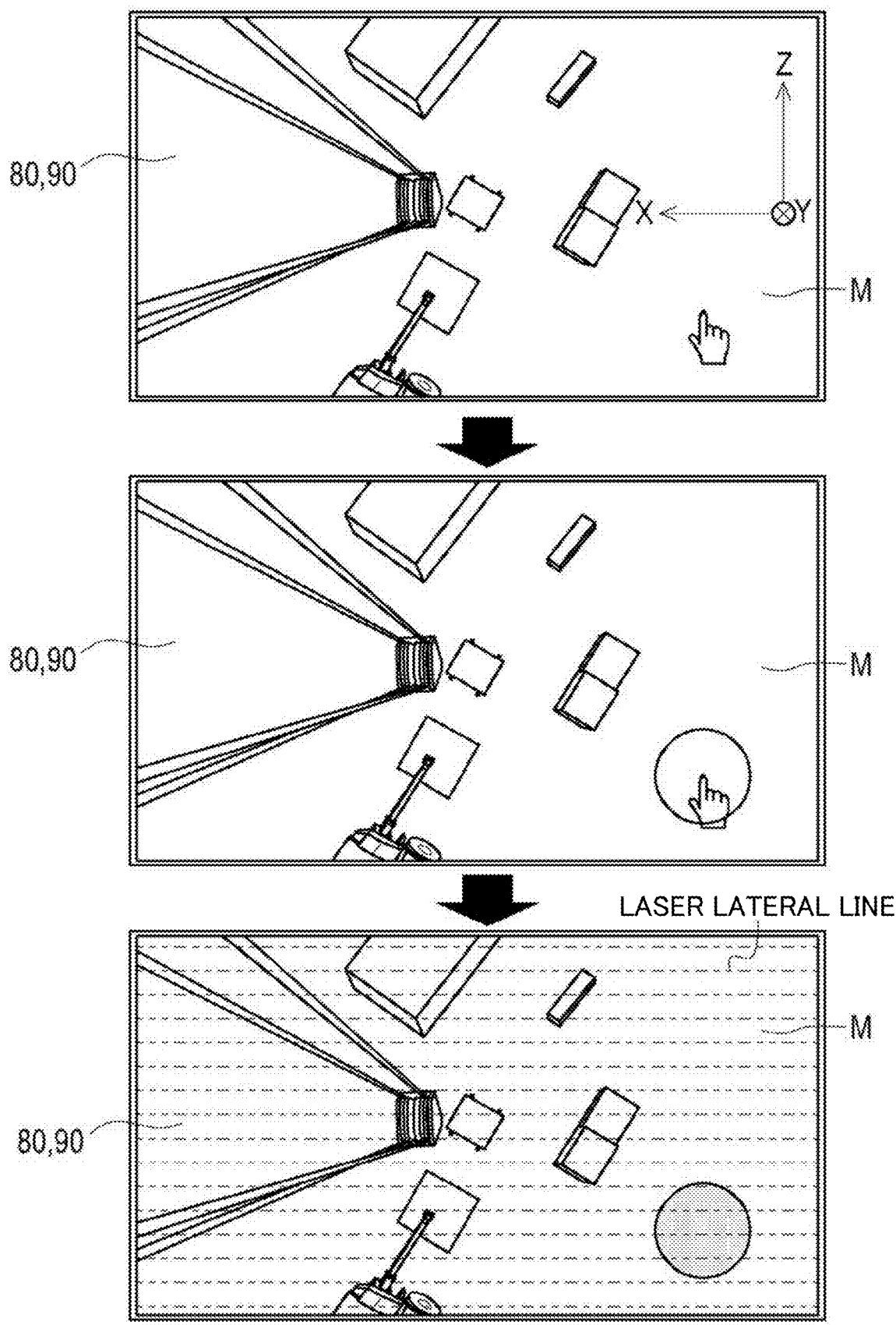
FIG. 14 is a schematic diagram illustrating a state of specification on a ground surface by an operator.

In a manual operation, as illustrated in the upper drawing of FIG. 14, the operator first specifies a position to be located on the ground surface on an image displayed on data display section 80. Thereafter, as illustrated in the middle drawing of FIG. 14, data processing section 70 generates a reference circle having a predetermined radius with respect to the specified position (point). Subsequently, as illustrated in the lower drawing of FIG. 14, data processing section 70 detects an overlap with point data p on laser lateral lines and selects the segments of point data p contained in the reference circle.

Figure 15A:
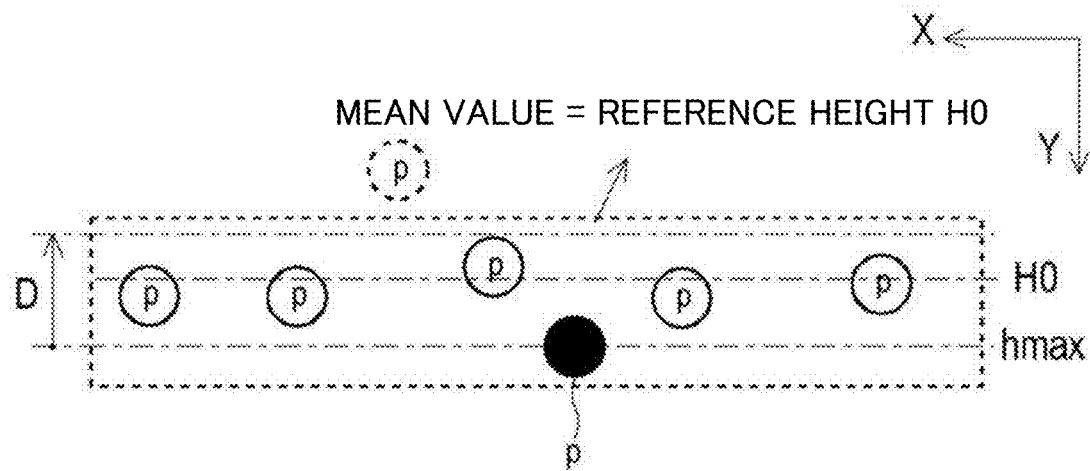
FIGS. 15A and 15B are explanatory drawings illustrating a method of calculating a reference height during specification on the ground surface, FIG. 15A illustrating the method of calculating the reference height, FIG. 15B illustrating a schematic diagram of a division state of the suspended load area.

Data processing section 70 first extracts, as illustrated in FIG. 15A, point data p at distance h maximized to distance hmax from the selected segments of point data p. Point data p at maximum distance hmax is assumed to be point data p at the closest position. Data processing section 70 then extracts point data p where deviation D of distance h falls within a certain range (7 cm or less in the present embodiment) with reference to maximum distance hmax, and calculates the mean value of distances h of extracted point data p. Data processing section 70 estimates that the calculated mean value is distance h to ground surface F and determines the height of ground surface F (hereinafter, will be referred to as reference height HO) based on the mean value.

Subsequently, data processing section 70 calculates height value H of point data p from distance h and reference height HO. As illustrated in FIG. 10, height value H is a height from reference height HO of point data p.

Guide information display device 50 is configured to generate guide information GD based on reference height HO of ground surface F after reference height HO is accurately obtained by the above process. Thus, in guide information display device 50, the shapes of suspended load W and ground object C around suspended load W can be accurately calculated based on the height of ground surface F.

Automatic estimation of ground surface F will be described below.

In the foregoing configuration, the operator specifies ground surface F. Data processing section 70 may automatically estimate ground surface F in guide information display device 50.

Figure 15B:
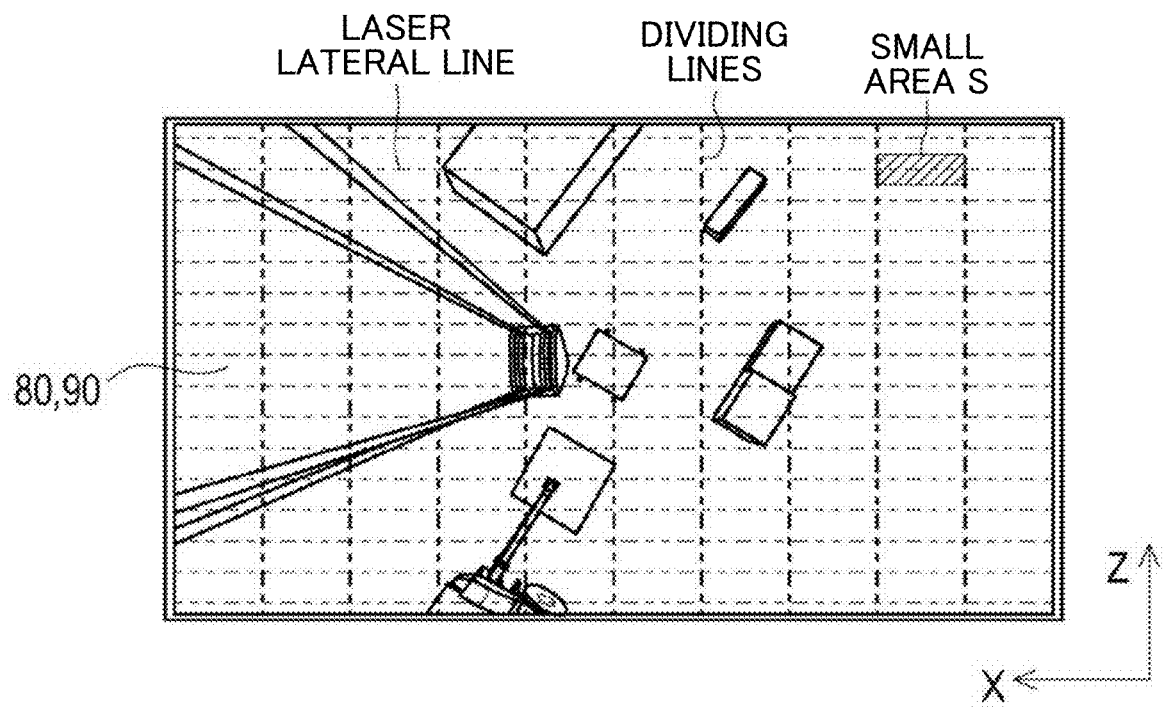

If data processing section 70 automatically estimates ground surface F, as illustrated in FIG. 15B, data processing section 70 divides suspended load area WA into small equal areas S (160 areas in the present embodiment).

Data processing section 70 then extracts point data p at maximum distance h (distance h is maximized to distance hmax) in each small area S and as illustrated in FIG. 15A, data processing section 70 extracts point data p where deviation D of distance h falls within a certain range (deviation D is 7 cm or less in the present embodiment) with reference to maximum distance hmax.

Subsequently, data processing section 70 calculates the mean value of distances h of extracted point data p in each small area S. Data processing section 70 automatically estimates reference height HO of ground surface F in each small area S from the calculated mean value of distances h.

Alternatively, data processing section 70 further averages the mean values of distances h calculated in small areas S with all small area S and automatically estimates reference height HO of ground surface F of suspended load area WA from the mean value. In this case, with reference to the maximum value of the average values of distances h in small areas S, data processing section 70 calculates reference height HO by using only small area S where deviation D from the maximum value falls within a predetermined threshold value.

As indicated in FIG. 12, "plane estimation" is then performed in data processing by data processing section 70 (STEP-104). Data processing section 70 estimates the top surfaces of suspended load W, which is a measuring object in suspended load area WA, and ground object C according to the following top-surface estimation method.

FIG. 13A is a plot of point cloud data P of one frame on suspended load area WA indicated in the XYZ coordinate system. Point cloud data P in suspended load area WA is schematically illustrated in the upper drawing of FIG. 16.

Figure 13B:
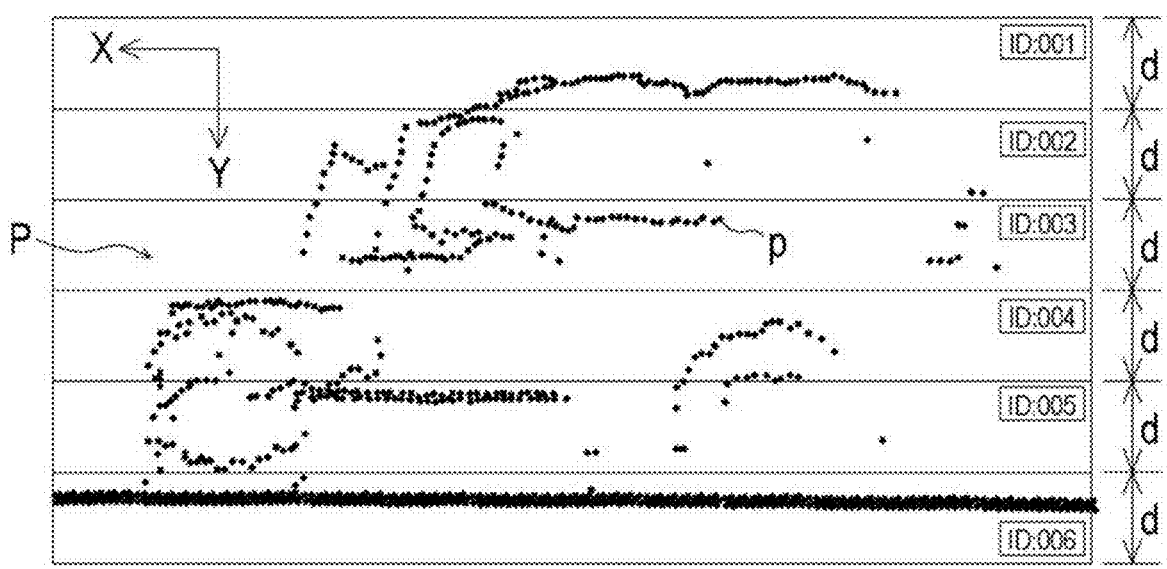
Figure 16:
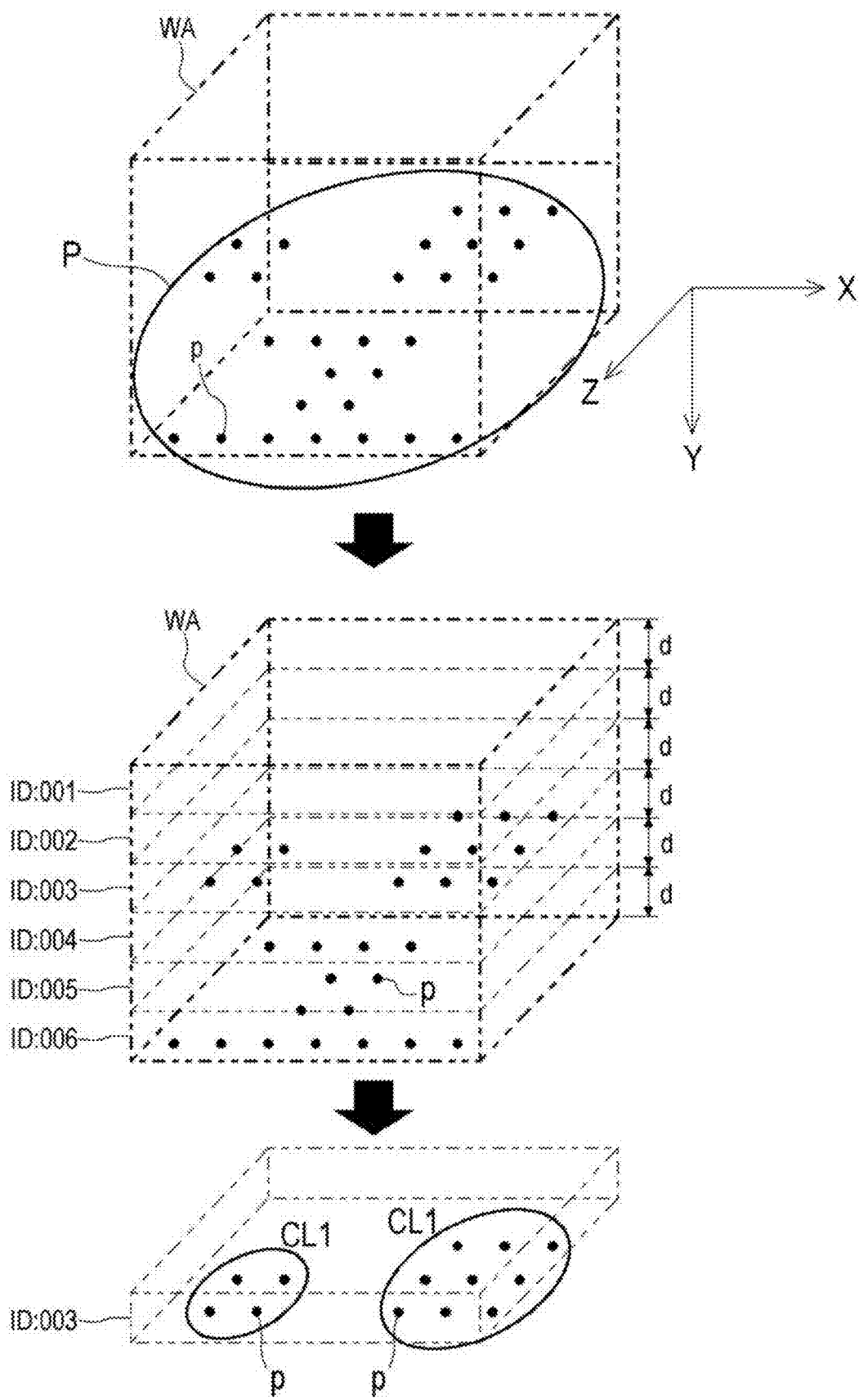
FIG. 16 is an explanatory drawing illustrating a method of generating plane clusters.

Data processing section 70 divides point cloud data P, which is acquired in suspended load area WA as illustrated in the upper drawing of FIG. 16, into layers having predetermined thickness d in the Y-axis direction as illustrated in the middle drawing of FIG. 16, and allocates point cloud data P to a plurality of groups (see FIG. 13B).

At this point, data processing section 70 allocates group IDs (in this case, ID: 001 to 006) to the respective groups and associates point data p with the group IDs.

Subsequently, data processing section 70 estimates a plane in each group by using segments of point data p included each group. In this case, "plane" is a plane on top of suspended load W and ground object C, that is, "top surfaces" of suspended load W and ground object C.

Figure 17:
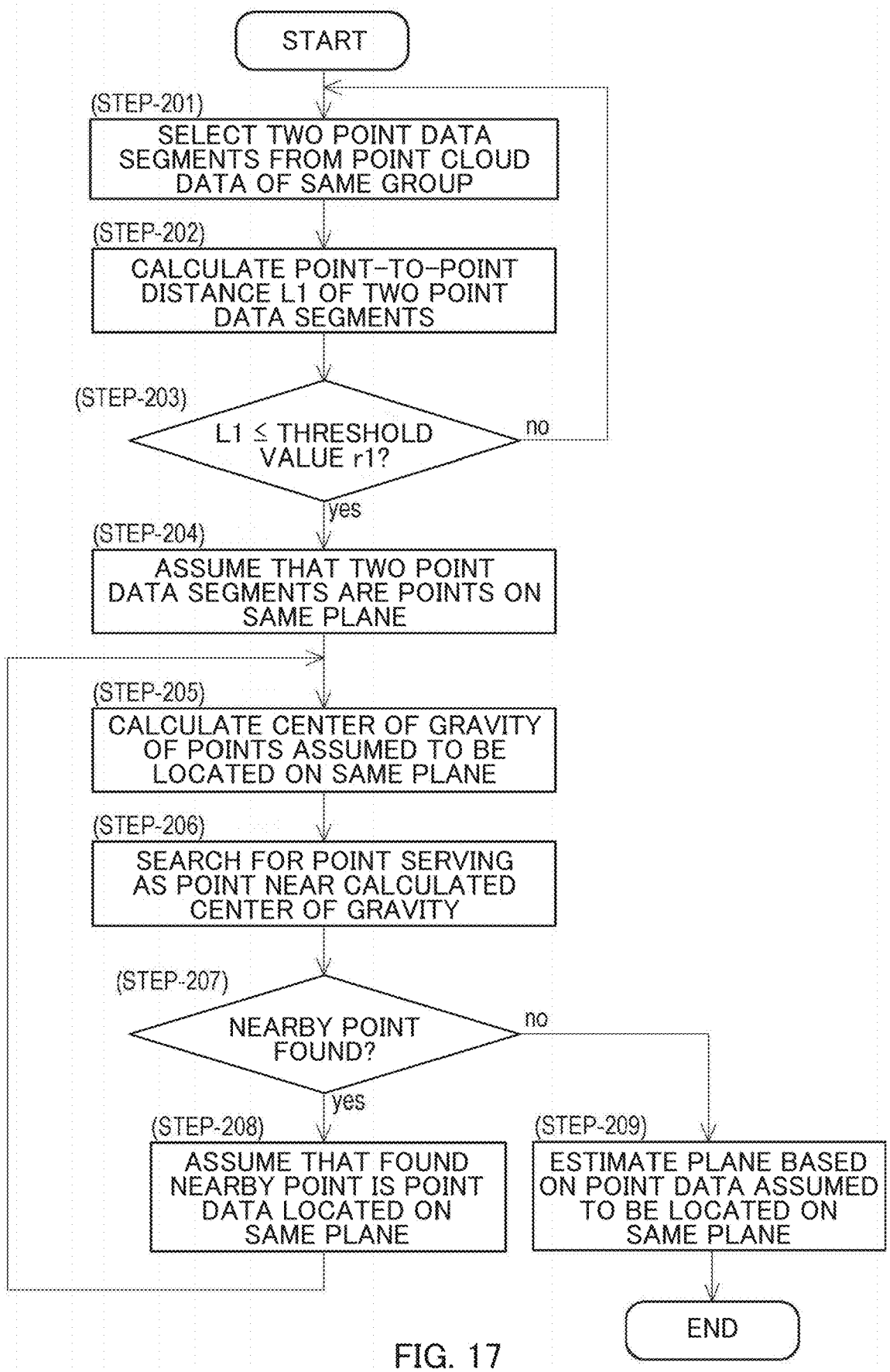
FIG. 17 is a flowchart indicating the steps of estimating a plane.
Figure 18:
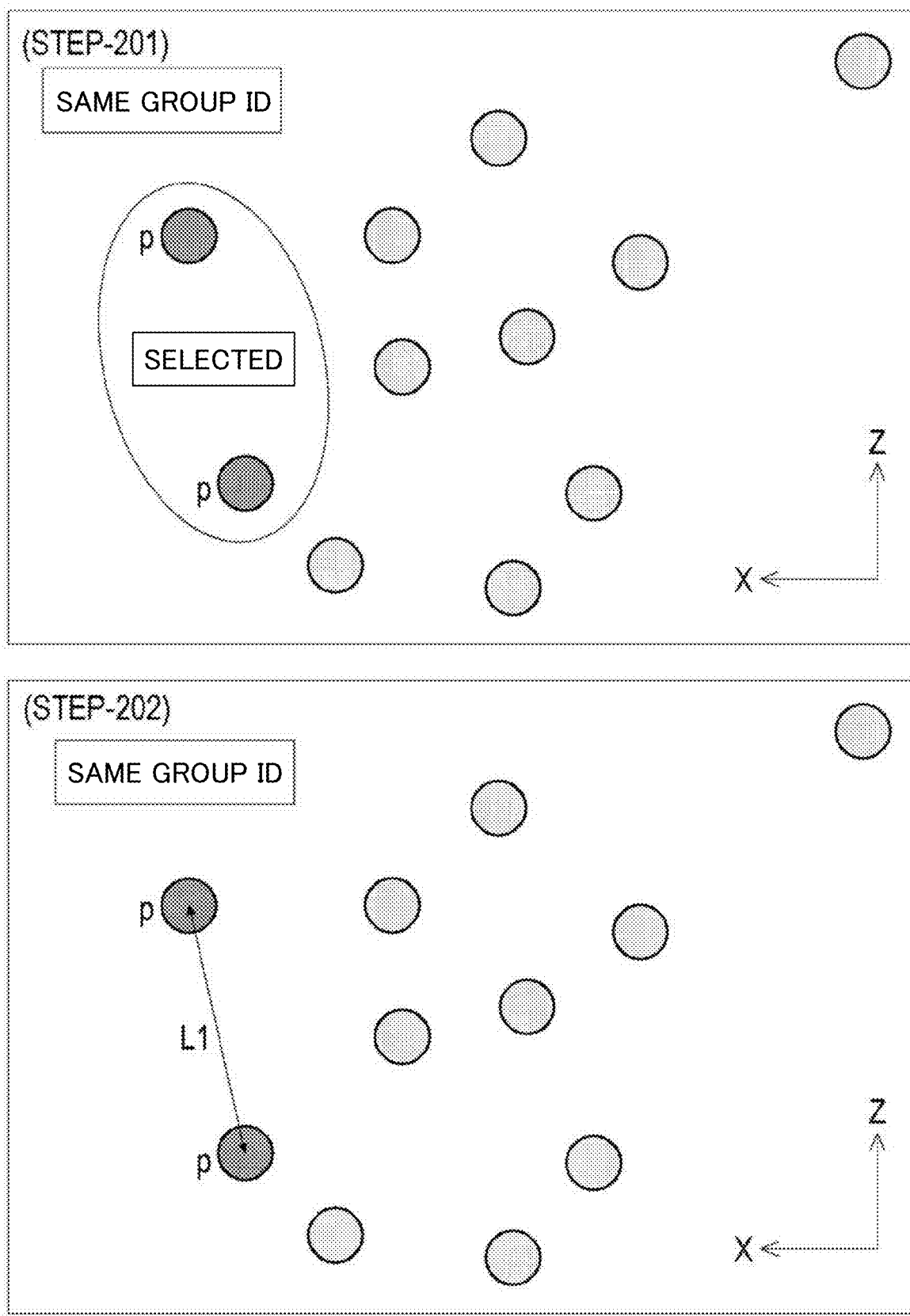
FIG. 18 is an explanatory drawing illustrating the steps of estimating the plane (STEP-201 and STEP-202)

Specifically, as illustrated in FIG. 17 and the upper drawing of FIG. 18, data processing section 70 first selects two segments of point data p from the segments of point data p included in the same group (the step of selecting two points: STEP-201).

As illustrated in FIG. 17 and the lower drawing of FIG. 18, data processing section 70 calculates distance L1 between the selected two segments of point data p (the step of calculating a distance between points: STEP-202).

Figure 19:
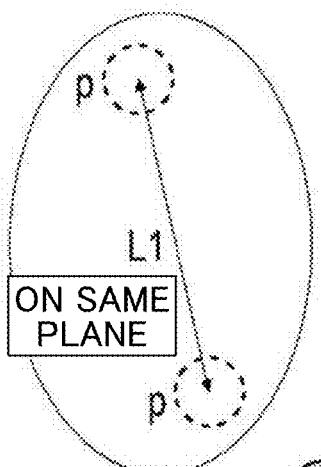
FIG. 19 is an explanatory drawing illustrating the steps of estimating the plane (STEP-203 to STEP-205)
Figure 19:
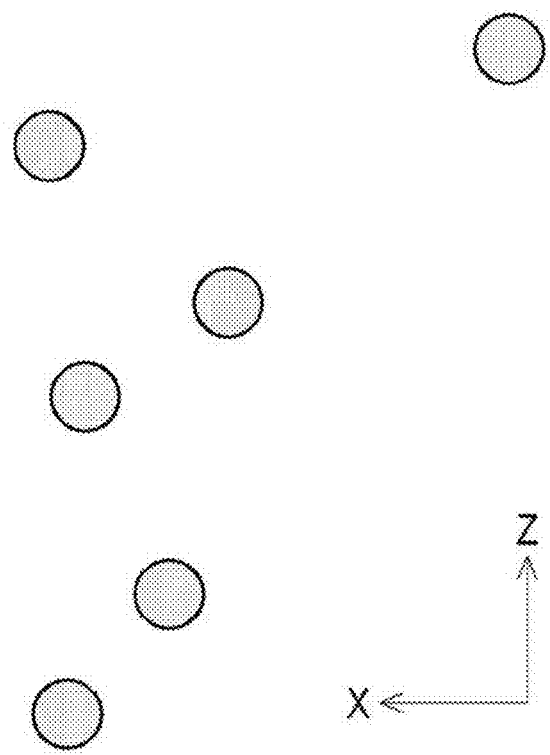
Figure 19:
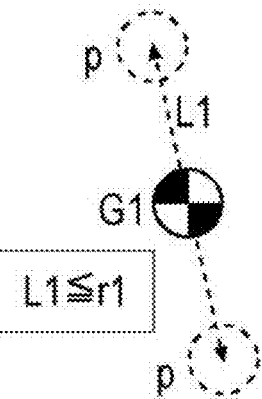
Figure 19:
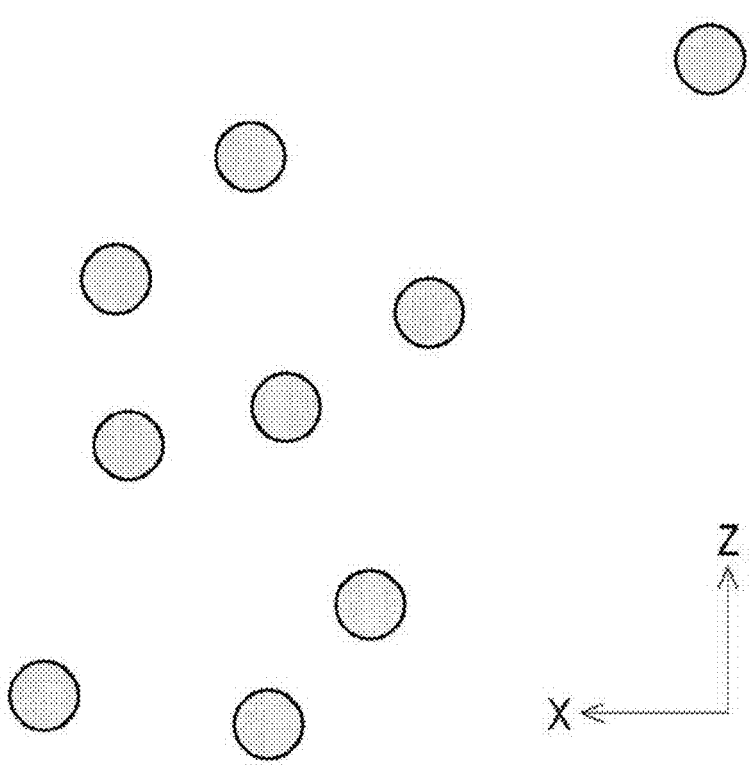

Subsequently, as illustrated in FIG. 17 and the upper drawing of FIG. 19, data processing section 70 assumes that the two segments (the two segments of point data p indicated by dotted lines) are placed on the same plane (the step of estimating a two-point plane: STEP-204) if distance L1 between the two segments is equal to or smaller than predetermined threshold value r1 (STEP-203). Data processing section 70 then calculates center of gravity G1 of the segments (in this case, selected two points) assumed to be located on the same plane as illustrated in FIG. 17 and the lower drawing of FIG. 19 (the step of calculating the center of gravity: STEP-205). If "no" is determined in (STEP-203), the process returns to (STEP-201) to select another two points.

Figure 20:
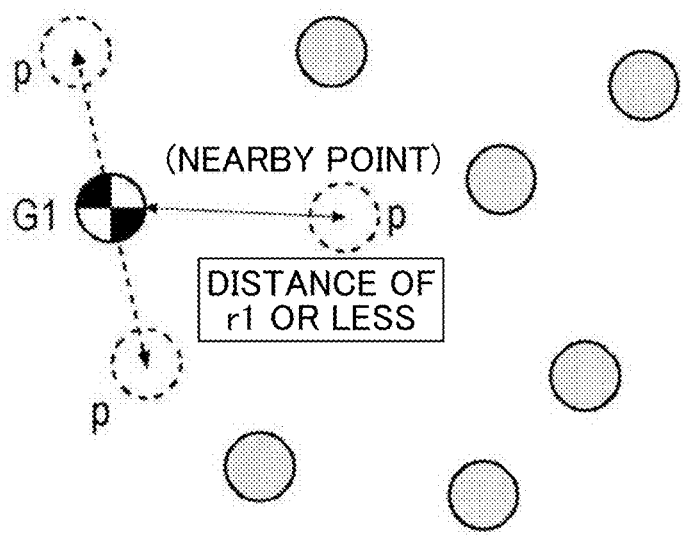
FIG. 20 is an explanatory drawing illustrating the steps of estimating the plane (STEP-206 to STEP-208)
Figure 20:
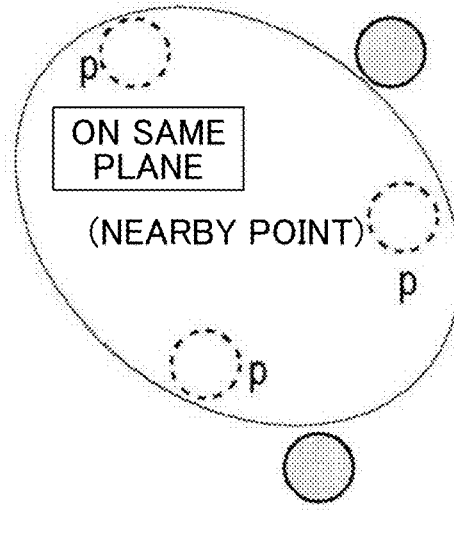

As illustrated in FIG. 17 and the upper drawing of FIG. 20, data processing section 70 then searches for point data p serving as a point near calculated center of gravity G1 (the step of searching for a nearby point: STEP-206). In this case, "nearby point" is a point where a point-to-point distance with respect to center of gravity G1 is equal to or smaller than threshold value r1.

Subsequently, as illustrated in FIG. 17 and the lower drawing of FIG. 20, data processing section 70 assumes that point data p as the nearby point is also located on the same plane as the selected two segments of point data p (the step of estimating a nearby-point plane: STEP-208) when point data p on the nearby point is found (STEP-207).

Figure 21:
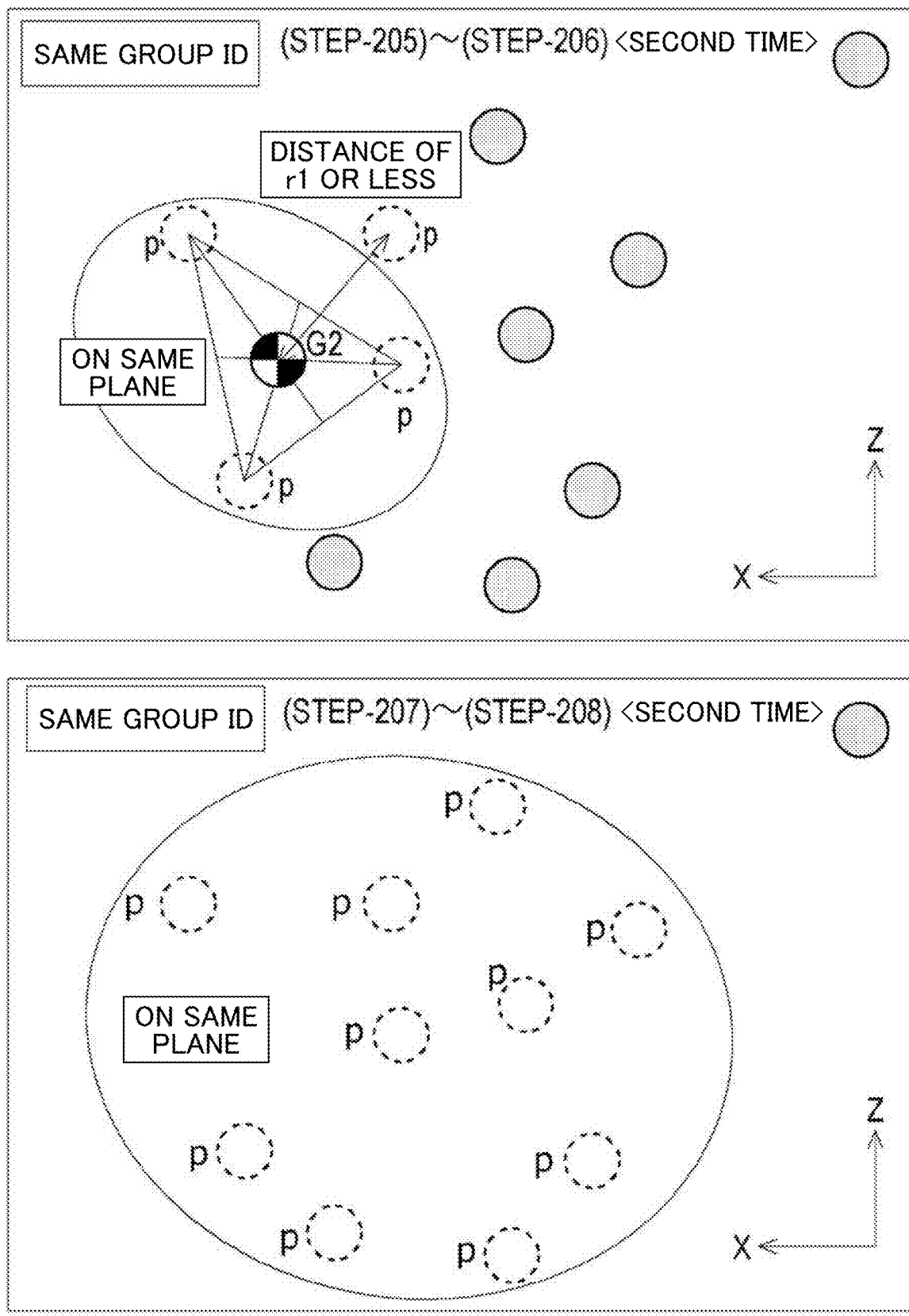
FIG. 21 is an explanatory drawing illustrating the steps of estimating the plane (STEP-206 to STEP-208 (second time))

As illustrated in FIG. 17 and the upper drawing of FIG. 21, data processing section 70 then returns to (STEP-205) and calculates another center of gravity G2 from the points assumed to be located on the same plane (the three segments of point data p indicated by dotted lines).

Data processing section 70 advances to (STEP-206) and further searches for point data p as a point near center of gravity G2. Subsequently, as illustrated in FIG. 17 and the lower drawing of FIG. 21, data processing section 70 assumes that point data p as the nearby point is also located on the same plane as the selected points (STEP-208) when point data p on the nearby point is further found (STEP-207).

Data processing section 70 then searches for a nearby point while calculating another center of gravity. Data processing section 70 repeatedly performs processing from (STEP-205) to (STEP-208) in the order mentioned until no point data p is detected as a nearby point.

Figure 22:
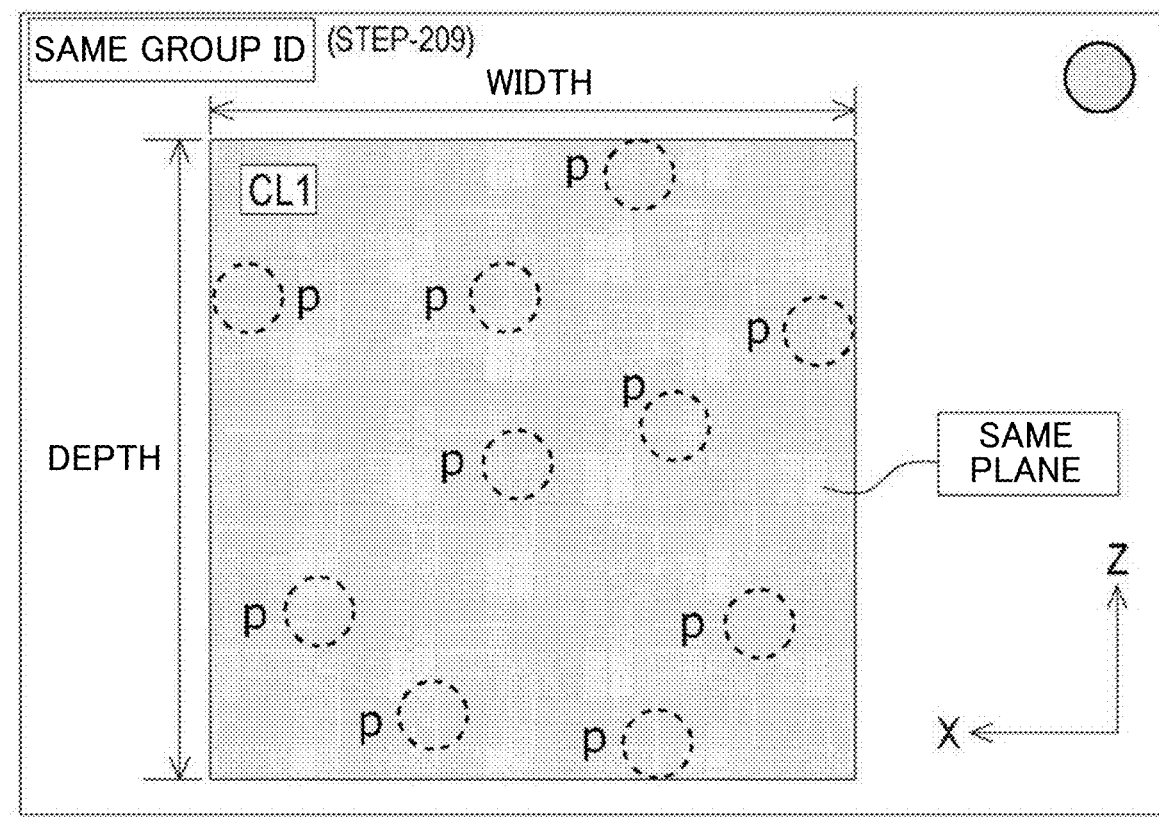
FIG. 22 is an explanatory drawing illustrating the steps of estimating the plane (a state of estimation of a top surface)

As indicated in FIG. 17, if another nearby point is not found, data processing section 70 determines "no" in (STEP-207) and clusters subsets (clusters) of point data p assumed to be located on the same plane as illustrated in FIG. 22, thereby estimating a plane (STEP-209). In this case. "clustering" is processing for dividing point cloud data P, which is a set of point data p, into clusters such that point data p included in each cluster is located on the same plane as a common feature.

Data processing section 70 divides point cloud data P into point data p assumed to be located on the same plane and sets plane cluster CL1 (see the lower drawing of FIG. 16). According to point data p belonging to plane cluster CL1, a plane (that is, "top surfaces" of suspended load W and ground object C) can be defined. Additionally, a plurality of plane clusters CL1 may be present in a group having the same group ID.

Furthermore, data processing section 70 estimates "width" of the plane from the maximum value and the minimum value of an X coordinate of point data p belonging to plain cluster CL1 and estimates "depth" of the plane according to the maximum value and the minimum value of a Z coordinate of point data p. In this way, data processing section 70 defines the plane where plane cluster CL1 is formed. The defined plane may be a polygon other than rectangles.

In the method of estimating a top surface, the top surfaces of suspended load W and ground object C can be estimated only based on point cloud data P corresponding to a top surface acquired by laser scanner 62. Thus, in the method of estimating a top surface according to the present embodiment, the top surfaces of suspended load W and ground object C can be estimated in a short time based on point cloud data P acquired by laser scanner 62, leading to real-time estimation of the top surfaces of suspended load W and ground object C.

Moreover, in the method of estimating a top surface, the top surfaces of suspended load W and ground object C can be estimated without using a statistical method, thereby reducing computational complexity required for estimating the top surfaces of suspended load W and ground object C as compared with a statistical method. Hence, in the method of estimating a top surface according to the present embodiment, the top surfaces of suspended load W and ground object C can be estimated in a shorter time based on point cloud data P acquired by laser scanner 62.

In the method of estimating the top surfaces of suspended load W and ground object C according to the present embodiment, crane 1 includes data acquisition section 60 provided on top boom member 22f of extendable/retractable boom 22 and laser scanner 62 acquires point cloud data P on suspended load W, ground object C, and ground surface F from above suspended load W. The method of estimating the top surface of a measuring object according to the present invention is not limited to application for measuring a suspended load of the crane and an object around the suspended load.

In other words, the method of estimating a top surface according to the present embodiment is widely applicable, for example, in the case where a laser scanner is provided on the boom distal end or the drone of a work vehicle (for example, an aerial work platform) including a boom and point cloud data on a measuring objects vertically disposed below the laser scanner is acquired from above, and the top surface of the measuring object is estimated based on the acquired point cloud data.

Subsequently, data processing section 70 combines estimated plane clusters CL1 (top surfaces).

Figure 23:
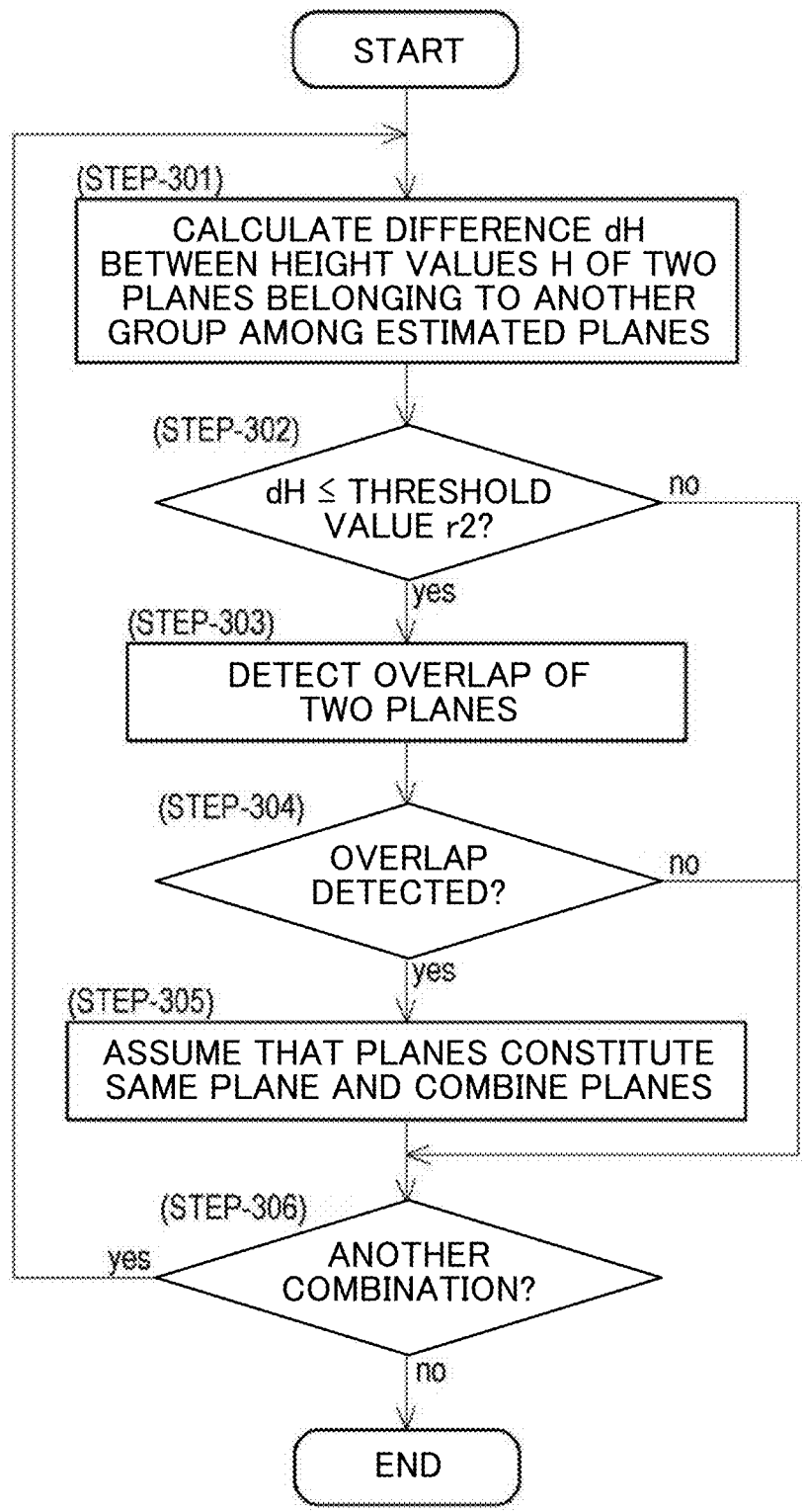
FIG. 23 is a flowchart indicating a method of combining planes in different groups.
Figure 24:
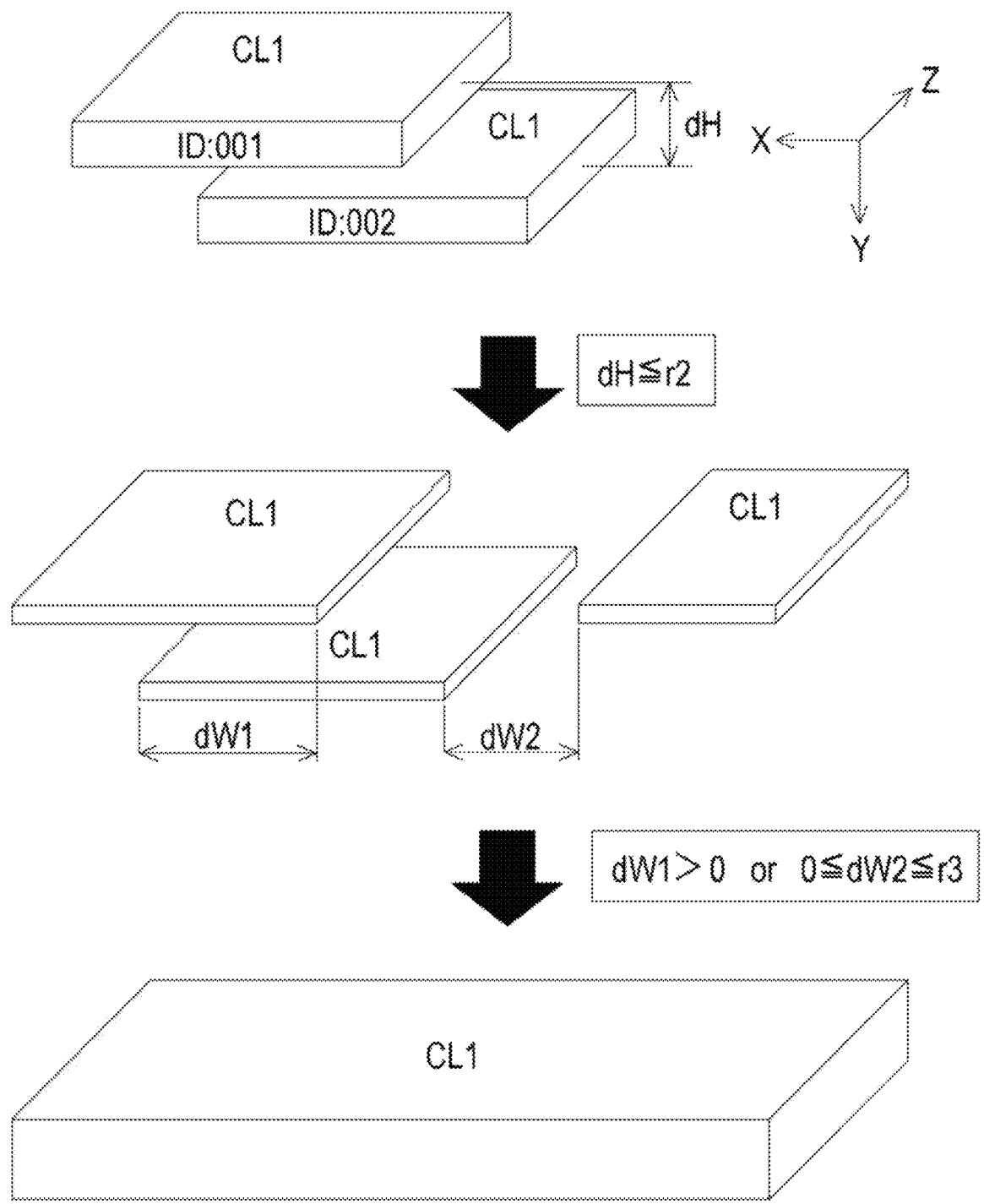
FIG. 24 is an explanatory drawing illustrating the method of combining the planes in the different groups.

As illustrated in FIG. 23 and the upper drawing of FIG. 24, data processing section 70 selects two plane clusters CL1 having different group IDs from among estimated plane clusters CL1 and calculates difference dH between height values H of plane clusters CL (STEP-301: the step of calculating a height value difference).

At this point, data processing section 70 searches for a combination having difference dH not larger than threshold value r2 (STEP-302). Height value H of plane cluster CL1 is the mean value of height values H of point data p belonging to plane cluster CL1.

Subsequently, when data processing section 70 detects a combination of plane clusters CL1 where difference dH between height values H is equal to or smaller than threshold value r2 as illustrated in FIG. 23 and the middle drawing of FIG. 24, data processing section 70 detects an overlap dW of plane clusters CL1 in the X-axis direction (STEP-303: the step of detecting an overlap). In this case, "overlap" is a degree of overlapping and a degree of separation in the X-axis direction of a plane defined by plane clusters CL1. As illustrated in FIGS. 23 and 24, if an overlapping amount dW1 of "width" is detected (dW1>0) or if a separation amount dW2 is equal to or smaller than predetermined threshold value r3 ($0 \leq dW2 \leq r3$), "overlap" is detected.

As illustrated in FIGS. 23 and 24, if "overlap" is detected (STEP-304), data processing section 70 assumes that point data p belonging to plane clusters CL1 is present on the same plane, combines two plane clusters CL1, and updates the clusters as another plane cluster CL1 (STEP-305: the step of combining planes). At this point, another height value H is calculated from point data p belonging to another plane cluster CL1.

As indicated in FIG. 23, data processing section 70 repeatedly performs the processing until a combination of plane clusters CL1 satisfying the conditions becomes undetected (STEP-306), thereby estimating a plane over multiple groups.

Data processing section 70 then outputs the combined planes (that is, plane clusters CL1).

The plane defined by plane clusters CL1 is a plane on top of suspended load W and ground object C, that is, the top surfaces of suspended load W and ground object C.

In the method of estimating a plane, a plane can be estimated without using the normal vector of point cloud data P. This reduces computational complexity as compared with the estimation of a plane by using the normal vector of point cloud data P.

Furthermore, in the method of estimating a plane, the top surfaces of suspended load W and ground object C are estimated, thereby recognizing the three-dimensional shapes of suspended load W and ground object C without acquiring point data p on the sides of suspended load W and ground object C.

As indicated in FIG. 12, "clustering of the same area" is then performed in data processing by data processing section 70 (STEP-105). In this case, "clustering" is processing for dividing point cloud data P, which is a set of point data p, into clusters such that point data p included in each cluster is located in "the same area" as a common feature.

"Clustering of the same area" is processing for clustering generated plane clusters CL (planes) from a different viewpoint, that is, whether the plane clusters are present in "the same area" or not regardless of whether the plane clusters constitute the same plane or not.

Figure 25:
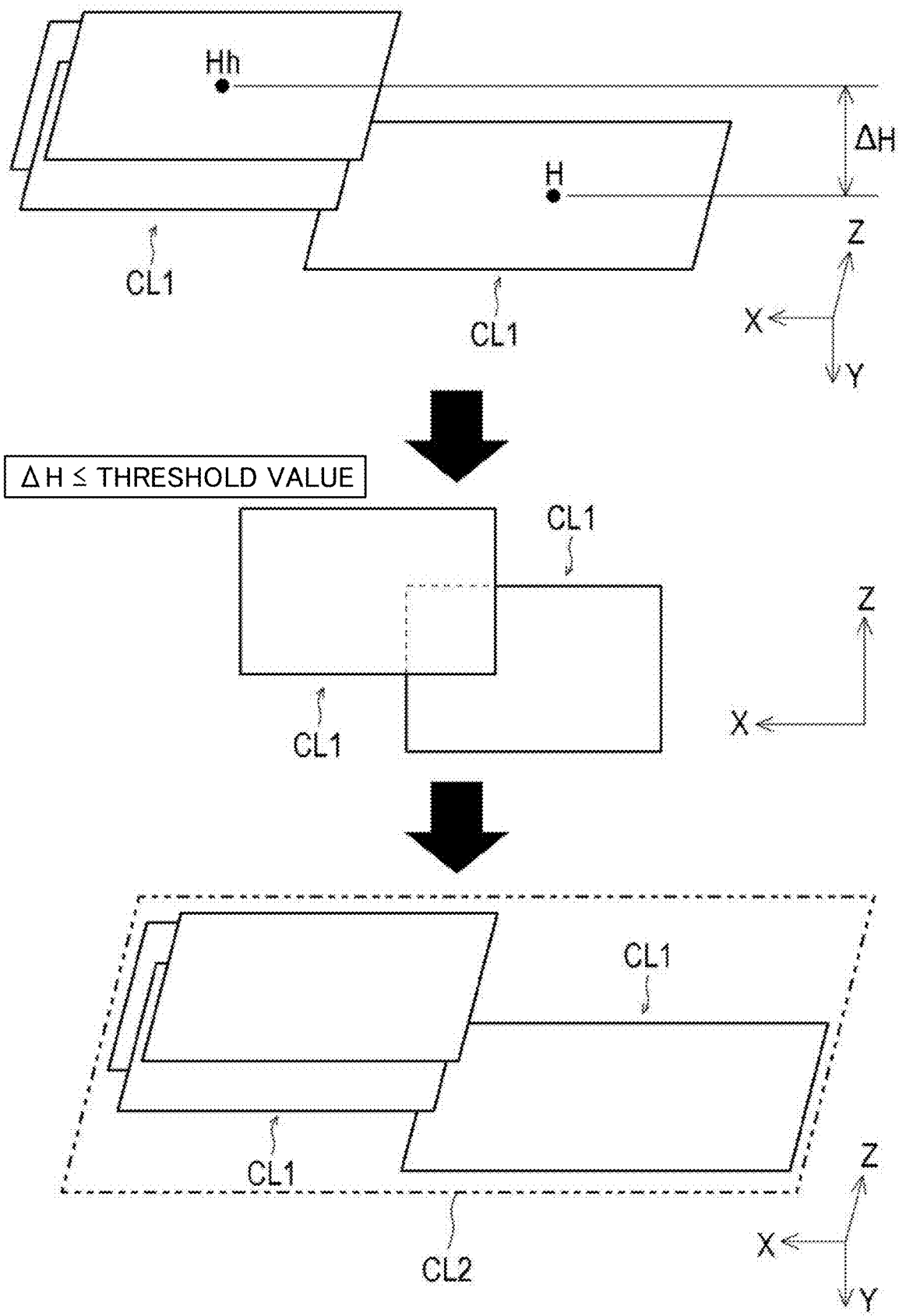
FIG. 25 is an explanatory drawing of clustering on the same area.

Specifically, as illustrated in the upper drawing of FIG. 25, data processing section 70 extracts plane cluster CL1 including point data p having height value H maximized to value Hh and another plane cluster CL1 that is not combined with plane cluster CL. Data processing section 70 then calculates difference ΔH between height values H of extracted plane clusters CL1 and advances to subsequent determination if difference ΔH is equal to or smaller than a predetermined threshold value.

In the subsequent determination, as illustrated in the middle drawing of FIG. 25, data processing section 70 confirms an overlap of two plane clusters CL1 in the Y-axis direction with difference ΔH not larger than the predetermined threshold value.

If two plane clusters CL1 overlap each other in the Y-axis direction, as illustrated in the lower drawing of FIG. 25, data processing section 70 assumes that plane clusters CL are located in "the same area" and forms same area cluster CL2 including plane clusters CL1.

Subsequently, data processing section 70 further searches for plane cluster CL1 including point data p having height value H maximized to value Hh and another plane cluster CL1 that is not combined with plane cluster CL1. If uncombined plane cluster CL1 is extracted, data processing section 70 makes a determination according to difference ΔH and confirms an overlap in the Y-axis direction. If plane cluster CL1 matching the conditions is found, plane cluster is added to same area cluster CL2.

Data processing section 70 repeatedly performs the processing until no plane cluster CL1 uncombined with plane cluster CL1 is detected, plane cluster CL1 including point data p having height value H maximized to value Hh. Through the processing, data processing section 70 forms same area cluster CL2.

Thereafter, point data p belonging to same area cluster CL2 formed thus is processed as a single shape in the display of guide information GD, which will be described later, and guide frame GD1 is displayed around same area cluster CL2.

Figure 26A:
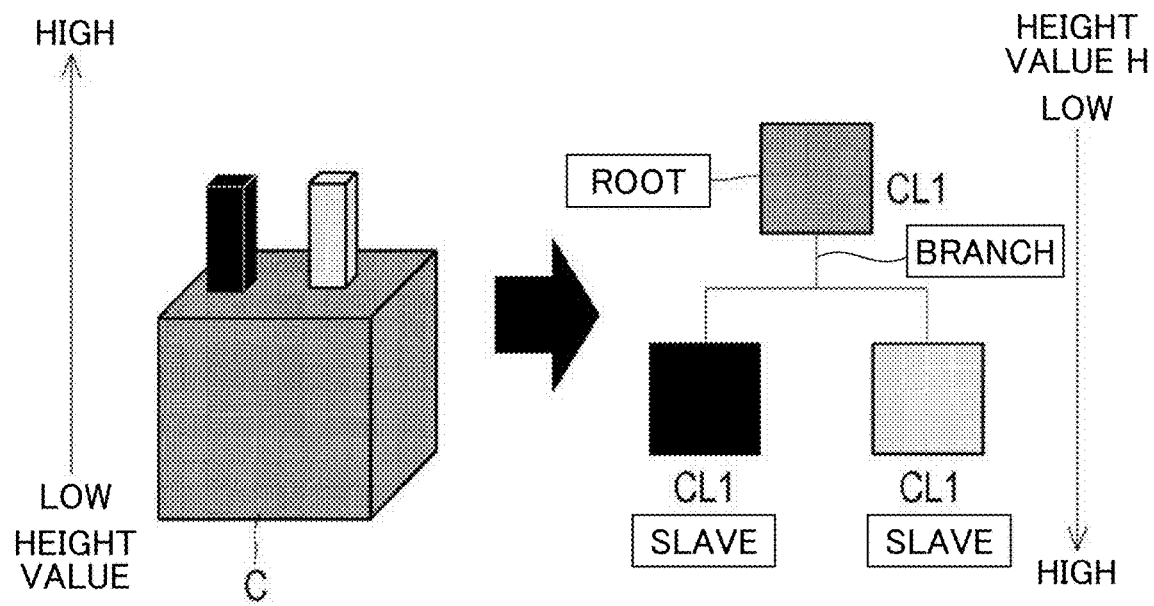
FIGS. 26A and 26B are explanatory drawings of hierarchical clustering, FIG. 26A illustrating a ground object of a first example, FIG. 26B illustrating a ground object of a second example.
Figure 26B:
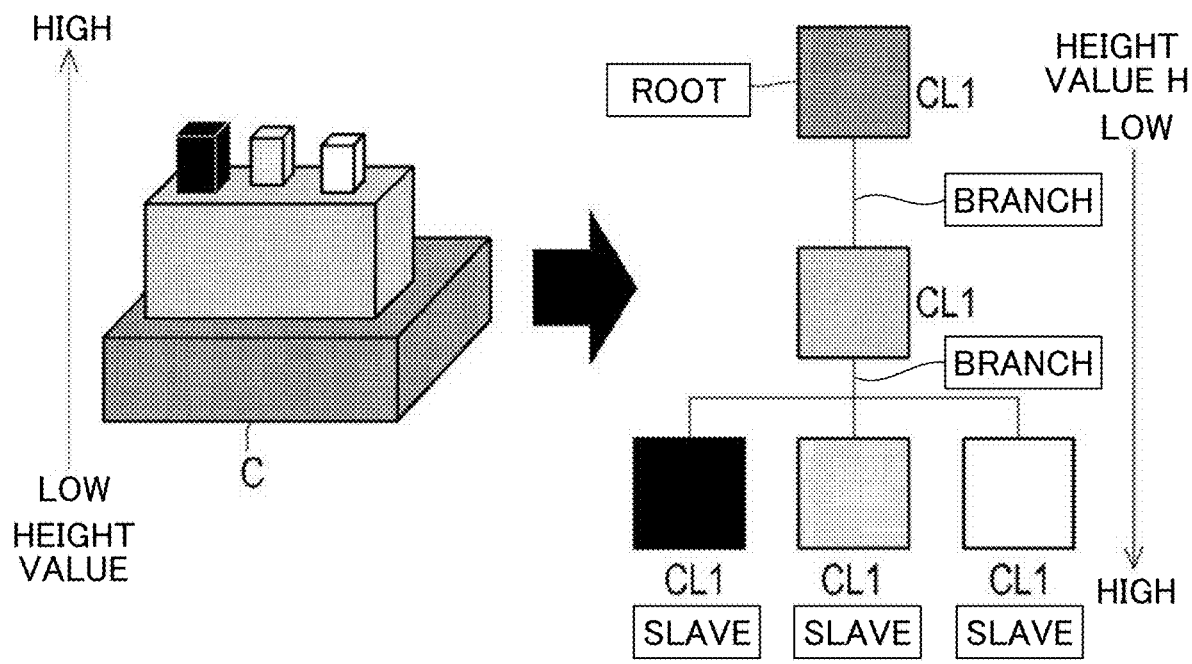

"Clustering of the same area" is preferably configured as hierarchical clustering using a tree structure based on height values as illustrated in FIGS. 26A and 26B. Data processing section 70 creates a tree structure using height value H for each ground object C in "clustering of the same area." FIG. 26A illustrates a first example of ground object C in hierarchical clustering using a tree structure. FIG. 26B illustrates a second example of ground object C in hierarchical clustering using a tree structure.

In hierarchical clustering using a tree structure based on height values, plane cluster CL1 having a minimum mean value of height values H is set as "root" by data processing section 70. If plane cluster CL1 overlaps plane cluster CL constituting "root" in the Y-axis direction, data processing section 70 extends "branch" from "root" and adds overlapping plane cluster CL1 to the end of "branch." Subsequently, plane cluster CL1 having a maximum mean value of height values H is set as "slave" by data processing section 70.

A method of generating guide frame GD1 will be described below.

Data processing section 70 acquires the three structure of ground object C, the tree structure being created in "clustering of the same area." Moreover, data processing section 70 acquires point data p included in plane clusters CL1 constituting the tree structure.

Figure 27:
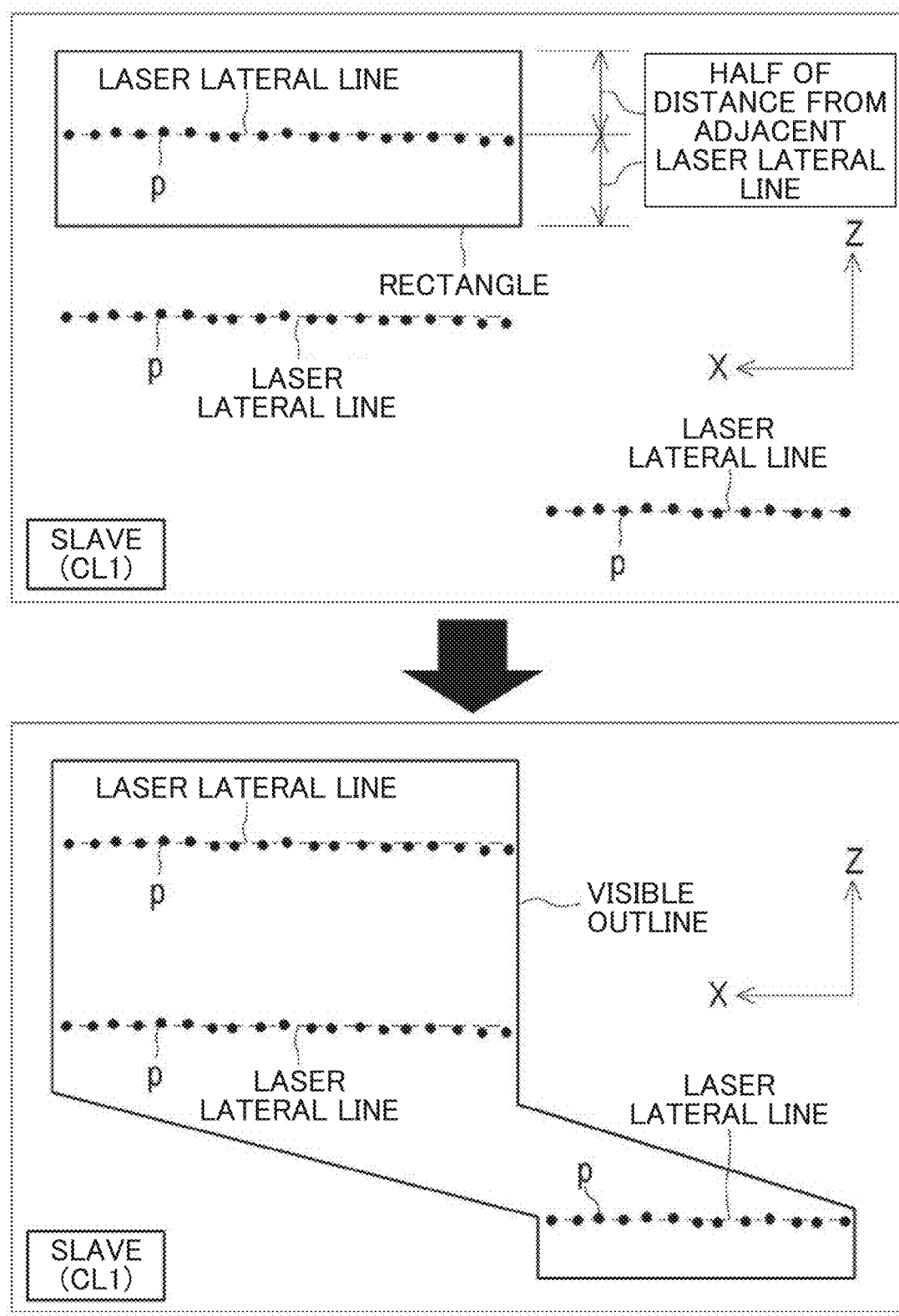
FIG. 27 is an explanatory drawing illustrating the steps of generating a guide frame.

As illustrated in the upper drawing of FIG. 27, data processing section 70 acquires point data p on a laser lateral line placed at a maximum depth in the Z-axis direction, from point data p on "slave" plane clusters CL1. Furthermore, data processing section 70 creates a rectangle that is separated from an adjacent laser lateral line by a half of a distance from the adjacent laser lateral line in the Z-axis direction and has a width in the X-axis direction so as to surround point data p.

Subsequently, if point data p is present on the laser lateral line adjacent to the created rectangle, data processing section 70 deforms the rectangle so as to contain entire point data p on the corresponding laser lateral line, forming a visible outline as illustrated in the lower drawing of FIG. 27.

Data processing section 70 then searches for point data p on the adjacent laser lateral line and repeats the processing until no point data p on the target laser lateral line is detected.

Finally, data processing section 70 creates a visible outline containing all plane clusters CL1 included in the selected tree structure.

As guide frame GD1, data processing section 70 outputs only a visible outline matching a condition from among created visible outlines.

Figure 28A:
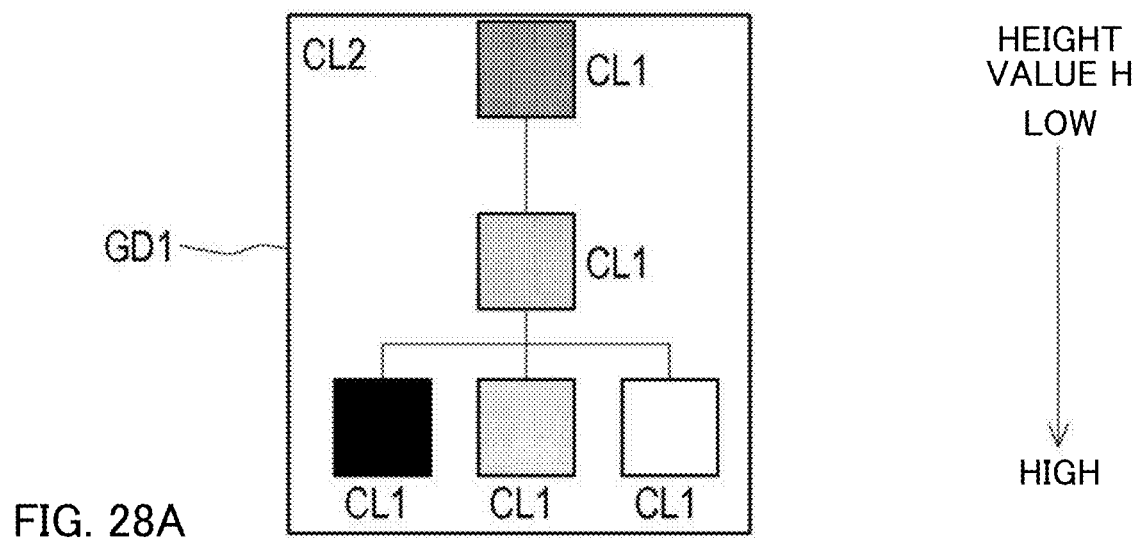
FIGS. 28A, 28B, and 28C illustrate setting examples of a same area cluster in hierarchical clustering, FIG. 28A illustrating the same area cluster surrounding the overall guide frame, FIG. 28B indicating that a plane cluster having a maximum height value is set as another same area cluster, FIG. 28C indicating that another area cluster is set, the same area cluster including all plane clusters where a difference in height value is not smaller than a threshold value.

As a condition for outputting a visible outline as guide frame GD1, for example, a condition for displaying only a visible outline serving as the overall frame of ground object C can be selected as illustrated in FIG. 28A. If the condition is selected, single guide frame GD1 surrounding overall ground object C is displayed for the ground object C on data display section 80.

Figure 28B:
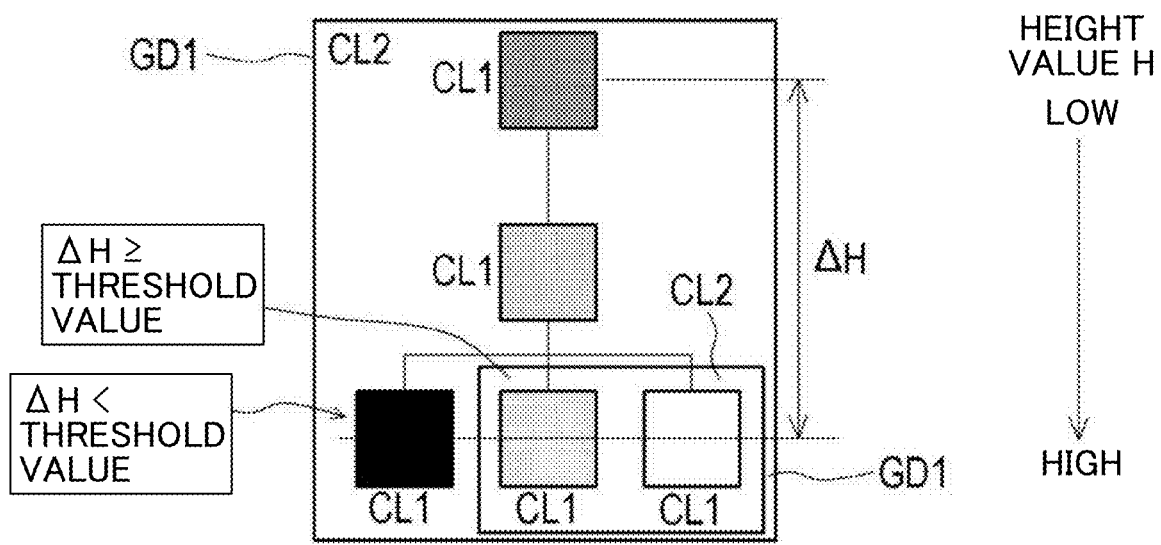

As a condition for outputting a visible outline as guide frame GD1, for example, a condition can be selected so as to display a visible outline for plane cluster CL1 having maximum height value H at each branch as illustrated in FIG. 28B from among visible outlines (sub frames) where a difference (difference ΔH) between height values H relative to "root" is not smaller than a threshold value. The visible outline is displayed in addition to the visible outline serving as the overall frame of ground object C. If the condition is selected, data display section 80 displays first guide frame GD1 surrounding overall ground object C and second guide frame GD1 included in first guide frame GD1, more specifically displaying guide information GD in consideration of the three-dimensional shape of ground object C.

Figure 28C:
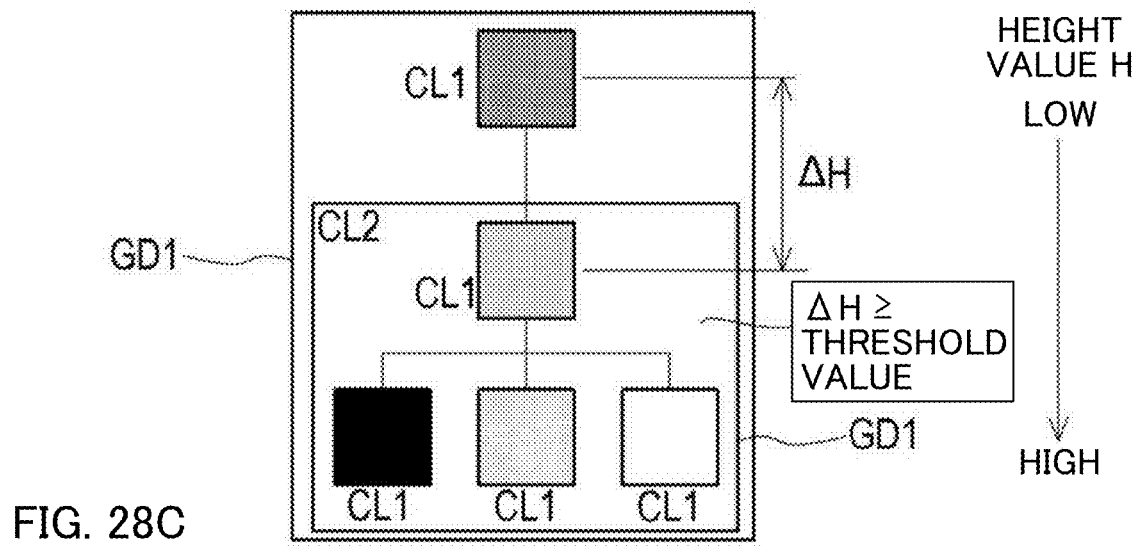

As a condition for outputting a visible outline as guide frame GD1, for example, a condition can be selected so as to display all visible outlines (sub frames) where a difference (difference ΔH) between height values H relative to "root" is not smaller than a threshold value as illustrated in FIG. 28C. The visible outline is displayed in addition to the visible outline serving as the overall frame of ground object C. Also in the case where the condition is selected, data display section 80 displays first guide frame GD1 surrounding overall ground object C and second guide frame GD1 included in first guide frame GD1, more specifically displaying guide information GD in consideration of the three-dimensional shape of ground object C.

Such display conditions can be achieved also by adjusting the threshold value of difference ΔH. An operator can optionally select the display conditions of guide frame GD1 so as to display guide information GD with greater ease of viewing.

In other words, in guide information display device 50, guide frame GD1 is created based on same area cluster CL2, so that guide frame GD1 can be created so as to more specifically express ground object C in consideration of the three-dimensional shape of ground object C. Moreover, in guide information display device 50, guide frame GD1 can be created around plane clusters CL1 present in the same area. In other words, guide information display device 50 can more specifically present guide information GD with ease of viewing.

As illustrated in FIG. 12, "synchronous processing on point cloud data and camera video" is subsequently performed in data processing by data processing section 70 (STEP-106).

In this processing, as illustrated in FIGS. 5A and 5B, point cloud data P acquired in the XYZ coordinate system is converted into the coordinate values of the camera-space coordinate system, is synchronized (positioned) with image M captured by camera 61, and then is outputted to data display section 80.

As indicated in FIG. 12, "guide display" is then performed in data processing by data processing section 70 (STEP-107).

Data processing section 70 generates guide information GD based on information on generated same area clusters CL2 and outputs the information to data display section 80.

For "guide display", "crane information" outputted from controller 34 of crane 1 is used. "Crane information" to be used includes information on the length and luffing angle of extendable/retractable boom 22, the operating radius of crane 1, the weight of suspended load W, and the like.

The series of data processing by data processing section 70 was described above. With this configuration, the three-dimensional shapes of suspended load W and ground object C can be accurately recognized and guide information GD can be generated with low computational complexity without the need for acquiring point data p on the sides of a measuring object. This configuration only requires low data computational complexity and thus is suitable for recognizing the shapes of suspended load W and ground object C in real time, allowing the use of data processing section 70 with a simple hardware configuration.

The contents of guide information GD will be described below.

In guide information display device 50, data display section 80 displays guide information GD. Guide information GD displayed on data display section 80 includes information on a position specified on ground surface F by an operator as illustrated in FIG. 8B.

Moreover, suspended load W can be specified in guide information display device 50. Suspended load W is specified on the screen as in the case where the operator specifies ground surface F, so that a plane (top surface) at the specified position is set to indicate the top surface of suspended load W. After suspended load W is specified, guide frame GD1 for suspended load W and guide frame GD1 for ground object C are preferably displayed with distinct line colors and thicknesses.

Information on the specified positions of ground surface F and suspended load W is displayed by markers shaped like circles.

Moreover, guide information GD displayed by data display section 80 includes guide frame GD1 created by data processing section 70.

Data processing section 70 outputs guide frame GD1 based on set same area cluster CL2. Data processing section 70 can provide guide frame GD1 of suspended load W with allowance for reliably avoiding a collision and output a frame line as guide frame GD1, the frame line being offset from the visible outline of suspended load W to the outside by a predetermined distance. Guide frame GD1 is displayed as a frame including line segments surrounding top surfaces (plane clusters CL1) estimated on suspended load W and ground object C.

Moreover, guide information GD displayed by data display section 80 includes height information GD2 from reference height HO to the underside of suspended load W and height information GD3 from reference height HO to the top surface of ground object C.

Height information GD2 of suspended load W is preferably displayed in an independent area at a position easily viewed on the screen of data display section 80.

Guide information display device 50 configured thus distinguishes between height information GD2 on suspended load W and height information GD3 on ground object C without fail.

Data processing section 70 calculates height information GD2 by subtracting the height of suspended load W from the height of the top surface of plane cluster CL1 that is assumed to be the top surface of suspended load W.

In guide information display device 50, the operator inputs information on suspended load W (hereinafter, will be referred to as "suspended load information") in advance to data processing section 70. "Suspended load information" is inputted from data input section 90 by the operator. Subsequently, data processing section 70 acquires the height of suspended load W by using "suspended load information."

Guide information display device 50 is configured such that height information GD3 on ground object C is displayed inside guide frame GD1 surrounding ground object C. Alternatively, in the case of small guide frame GD1, guide information display device 50 displays the height information partially superimposed on guide frame GD1.

Guide information display device 50 configured thus clarifies correspondence between ground object C and height information GD3.

Furthermore, guide information display device 50 is configured such that data processing section 70 changes the line color of guide frame GD1 according to height value H of plane cluster CL1 corresponding to guide frame GD1.

With this configuration, guide information display device 50 allows an operator to roughly perceive the height values (heights) of suspended load W and ground object C when viewing guide frame GD1. Thus, in guide information display device 50, the heights of suspended load W and ground object C can be presented with higher accuracy.

Furthermore, guide information display device 50 is configured such that data processing section 70 changes the font color of height information GD2 according to height value H of plane cluster CL1 corresponding to guide frame GD1.

With this configuration, guide information display device 50 allows an operator to roughly perceive the height values (heights) of suspended load W and ground object C when viewing height information GD2. Thus, in guide information display device 50, the heights of suspended load W and ground object C can be presented with higher accuracy.

Moreover, the display of guide information GD by guide information display device 50 includes path information on suspended load W. The path information on suspended load W includes operating radius information GD4 on suspended load W and axis information GD5 on extendable/retractable boom 22 of crane 1.

Operating radius information GD4 is a guide for the path of suspended load W when extendable/retractable boom 22 is swiveled from a current status. Suspended load W moves along a circle indicated as operating radius information GD4.

Axis information GD5 is a guide for the path of suspended load W when extendable/retractable boom 22 is luffed up and extended or retracted from a current status. Suspended load W moves along a straight line indicated as operating radius information GD4.

In guide information display device 50, operating radius information GD4 on suspended load W and axis information GD5 on extendable/retractable boom 22 are generated based on "crane information."

Data processing section 70 calculates the operating radius of crane 1 based on "crane information", generates a circle indicating the operating radius, and outputs the circle as operating radius information GD4.

Moreover, data processing section 70 calculates the axial direction of extendable/retractable boom 22 based on "crane information", generates a straight line indicating the axial direction, and outputs the straight line as axis information GD5.

Furthermore, guide information display device 50 is configured to display operating radius information GD4 and axis information GD5 as broken lines and display the lengths and intervals of the broken lines as guide lengths (hereinafter, will be referred to as a reference length). For example, in the case of a reference length of 1 m, the lengths and intervals of the broken lines on the display of operating radius information GD4 and axis information GD5 are changed according to the size of suspended load area WA displayed on data display section 80. The lengths and intervals are equivalent to 1 m on ground surface F at a current scale.

Guide information display device 50 is configured to display the lengths and intervals of the broken lines with respect to the reference length (for example, 1 m), allowing the operator to perceive the scale of suspended load W and ground object C based on guide information GD.

Moreover, data processing section 70 calculates the height of data acquisition section 60 based on "crane information", calculates the size of suspended load area WA and the size of the display range of data display section 80, and changes the scale of the broken lines (the scale of the broken lines and the intervals) displayed as operating radius information GD4 and axis information GD5 according to the calculation result.

The display of guide information GD by guide information display device 50 includes warning display for preventing contact between suspended load W and ground object C.

Data processing section 70 determines that contact may occur if a horizontal distance is not larger than a predetermined threshold value (for example, 1 m) and a vertical distance is not larger than a predetermined threshold value (for example, 1 m) when suspended load W and ground object C are projected onto a horizontal plane.

Figure 29:
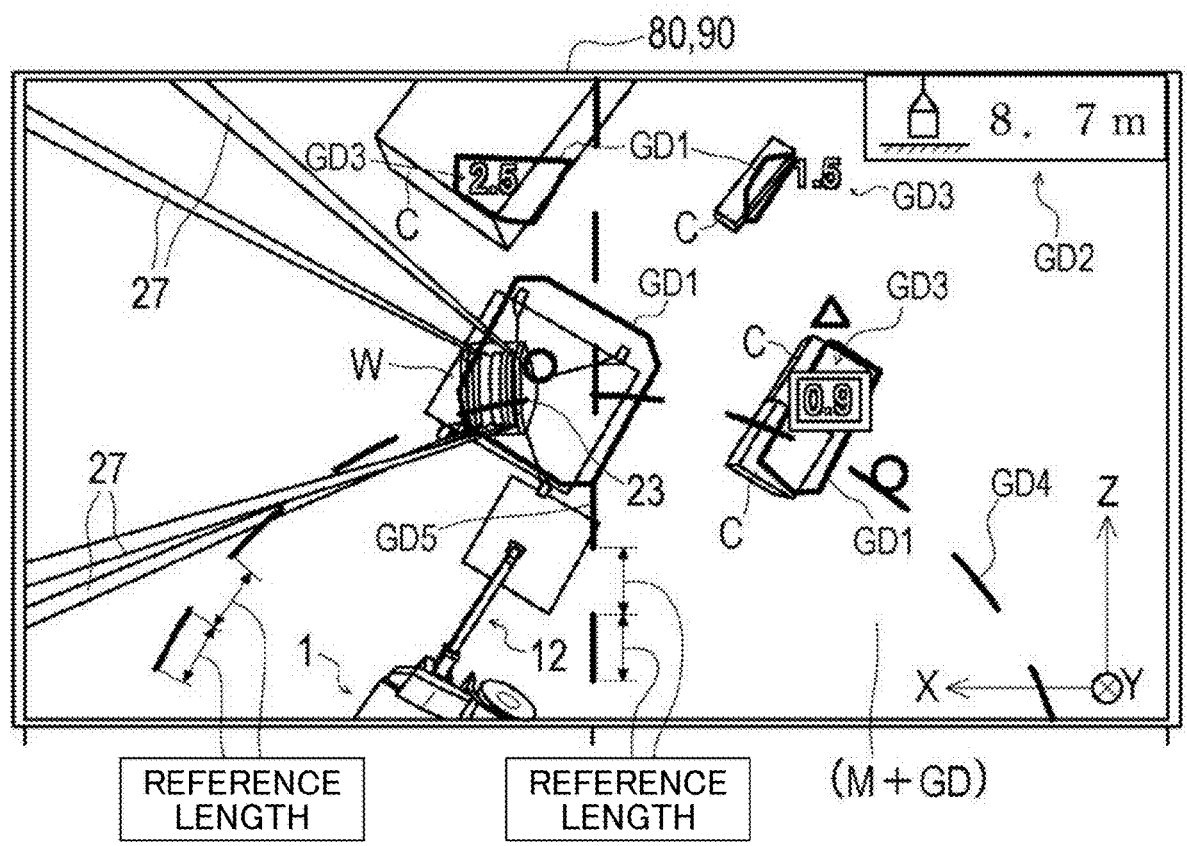
FIG. 29 is a schematic diagram of warning display on the data display section.

At this point, as illustrated in FIG. 29, guide frame GD1 and height information GD2 on ground object C that may come into contact with suspended load W are outputted so as to be emphasized from data processing section 70. Alternatively, guide frame GD1 and height information GD2 on ground object C are outputted while blinking from data processing section 70. In guide information display device 50, guide frame GD1 and height information GD2 on ground object C serving as warning display are outputted from data processing section 70 and is displayed on data display section 80, thereby calling attention to an operator.

Figure 30:
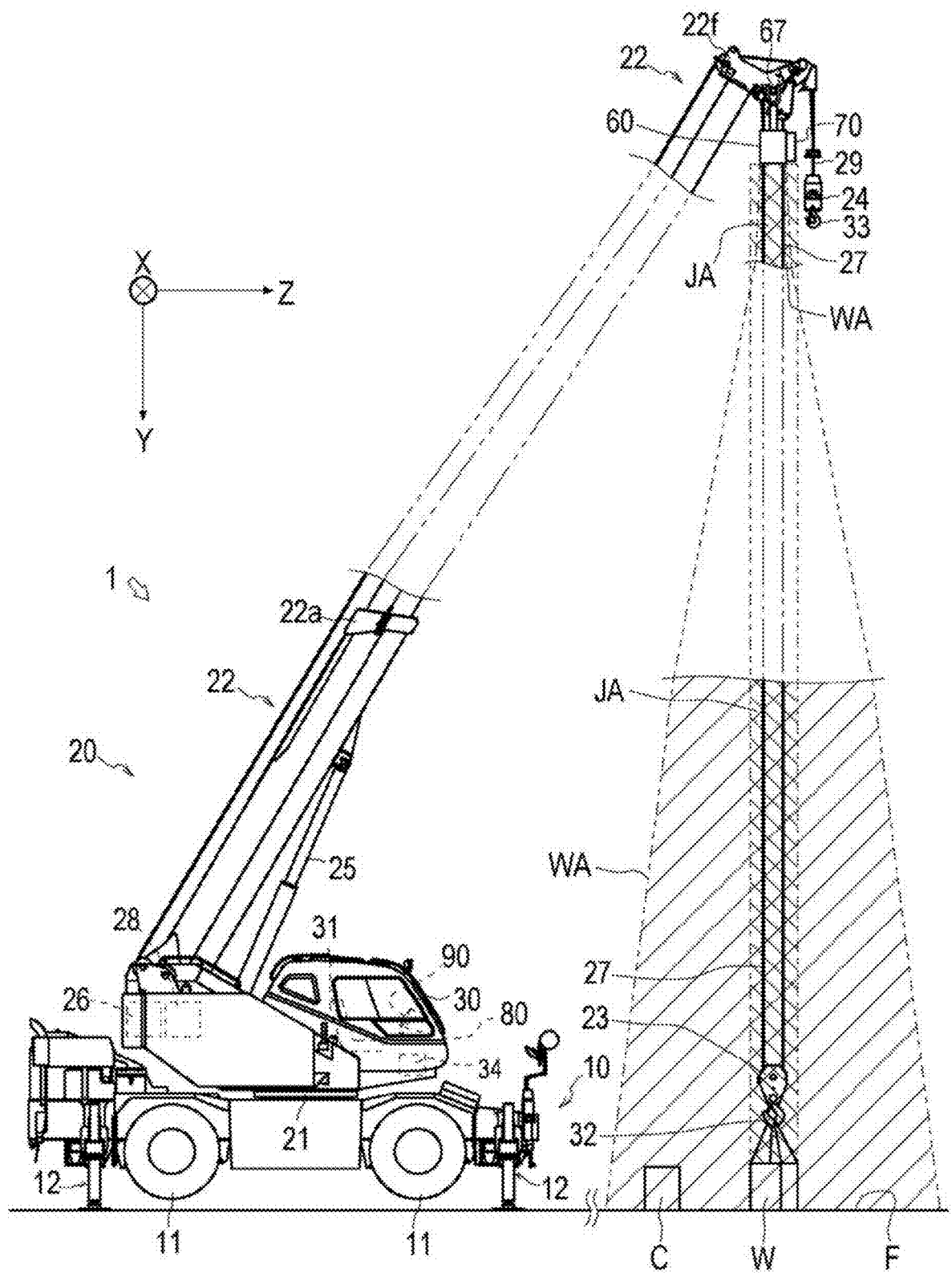
FIG. 30 is an explanatory drawing of a setting state of an excluded area.

Moreover, in guide information display device 50, an excluded area JA is set between suspended load W and top boom member 22f as illustrated in FIG. 30 when guide information GD is generated by data processing section 70. Data processing section 70 then excludes point data p acquired in excluded area JA, from data processing.

Main wire rope 27 passes through excluded area JA. In guide information display device 50, main wire rope 27 is not included in the generation (measuring object) of guide information GD, thereby presenting more accurate guide information GD with ease of viewing. The lower end of excluded area JA has a height set at a position separated from the top surface of suspended load W by a predetermined distance so as not to affect the generation of guide frame GD1 of suspended load W.

Guide information display device 50 configured thus can accurately present guide information GD to an operator of crane 1, guide information GD including guide frame GD1 on the shapes of suspended load W and ground object C near suspended load W and height information GD2 and GD3 on the heights of suspended load W and ground object C.

For example, even if an operator cannot directly recognize suspended load W, guide information display device 50 configured thus allows the operator to efficiently and safely operate crane 1 based on guide information GD indicated by guide information display device 50.

REFERENCE SIGNS LIST

1 Crane
50 Guide information display device
60 Data acquisition section
61 Camera
62 Laser scanner
70 Data processing section
80 Data display section
P Point cloud data
W Suspended load
F Ground surface
C Ground object
M Image (captured by a camera)
GD Guide information
GD1 Guide frame
GD2 Height information (on the underside of a suspended load)
GD3 Height information (on the top surface of a ground object)
WA Suspended load area
CL1 Plane cluster
CL2 Same area cluster

The invention claimed is:

1. A guide information display apparatus, comprising:
a data display section;
a data acquisition section that acquires image data of a suspended load region taken by a camera, and surface shape data of an object in the suspended load region scanned by a laser scanner, and
a data processing section that creates a guide frame corresponding to the object based on the surface shape data and causes the guide frame to be displayed on the data display section while superimposing the created guide frame on the object in the image data,
wherein the surface shape data is point cloud data acquired by scanning the object in the suspended load region from a top surface, and the object includes a suspended load and a ground object in the suspended load region.

2. The guide information display apparatus according to claim 1, wherein the data processing section structures the point cloud data into a hierarchy from a distance direction from the laser scanner, cluster points which belong to a same layer and for which an inter-point distance is equal to or smaller than a predetermined value, and creates the guide frame for each of the cluster points of the point cloud data.

3. The guide information display apparatus according to claim 2, wherein the data processing section causes an elevation value of each cluster from a ground surface to be displayed in association with the guide frame on the data display section as guide information.

4. The guide information display apparatus according to claim 3, wherein the data processing section causes a height of an underside of the suspended load from a ground surface to be displayed on the data display section as guide information.

5. A work machine, comprising the guide information display apparatus according to claim 3.

6. A work machine, comprising the guide information display apparatus according to claim 3, wherein
the data processing section causes path information on the suspended load or axis information on a boom of the work machine to be displayed as guide information while superimposing the path information or the axis information on the image data.

7. A work machine, comprising the guide information display apparatus according to claim 4.

8. A work machine, comprising the guide information display apparatus according to claim 4, wherein
the data processing section causes path information on the suspended load or axis information on a boom of the work machine to be displayed as guide information while superimposing the path information or the axis information on the image data.

9. The guide information display apparatus according to claim 2, wherein the data processing section causes a height of an underside of the suspended load from a ground surface to be displayed on the data display section as guide information.

10. A work machine, comprising the guide information display apparatus according to claim 9.

11. A work machine, comprising the guide information display apparatus according to claim 9, wherein
the data processing section causes path information on the suspended load or axis information on a boom of the work machine to be displayed as guide information while superimposing the path information or the axis information on the image data.

12. A work machine, comprising the guide information display apparatus according to claim 2.

13. A work machine, comprising the guide information display apparatus according to claim 2, wherein
the data processing section causes path information on the suspended load or axis information on a boom of the work machine to be displayed as guide information while superimposing the path information or the axis information on the image data.

14. A work machine, comprising the guide information display apparatus according to claim 1.

15. A work machine, comprising the guide information display apparatus according to claim 1, wherein
the data processing section causes path information on the suspended load or axis information on a boom of the work machine to be displayed as guide information while superimposing the path information or the axis information on the image data.

* * * * *